(12) United States Patent
LeVey

(10) Patent No.: US 12,270,216 B2
(45) Date of Patent: Apr. 8, 2025

(54) CLAMP SYSTEM

(71) Applicant: Dean R. LeVey, Rochester, NY (US)

(72) Inventor: Dean R. LeVey, Rochester, NY (US)

( * ) Notice: Subject to any disclaimer, the term of this patent is extended or adjusted under 35 U.S.C. 154(b) by 234 days.

(21) Appl. No.: 17/740,617

(22) Filed: May 10, 2022

(65) Prior Publication Data

US 2022/0364382 A1    Nov. 17, 2022

Related U.S. Application Data

(60) Provisional application No. 63/186,913, filed on May 11, 2021.

(51) Int. Cl.
*E04H 12/22* (2006.01)
*F16B 2/08* (2006.01)
*F16L 3/12* (2006.01)
*A45B 11/00* (2006.01)

(52) U.S. Cl.
CPC ............... *E04H 12/22* (2013.01); *F16B 2/08* (2013.01); *A45B 11/00* (2013.01)

(58) Field of Classification Search
CPC . E04H 12/22; F16B 2/08; A45B 11/00; F16L 3/137; F16L 3/233; F16L 3/11; F16L 3/14; F16L 3/33; A47B 2097/003; A47B 96/04; A47F 3/00
USPC .......................................................... 248/62
See application file for complete search history.

(56) References Cited

U.S. PATENT DOCUMENTS

| | | | | |
|---|---|---|---|---|
| 1,262,763 A * | 4/1918 | Farley | ....................... | F16L 3/14 248/62 |
| 1,362,244 A * | 12/1920 | Farley | ...................... | F16L 3/133 248/62 |
| 2,099,756 A * | 11/1937 | Seigle | ................. | F24F 13/0254 285/133.11 |
| 3,332,654 A | 7/1967 | Jacobson | | |
| 4,790,574 A * | 12/1988 | Wagner | .................... | F16L 21/06 D8/396 |
| 4,991,801 A * | 2/1991 | Trumbull | ................ | F16L 3/221 248/62 |
| 5,028,161 A * | 7/1991 | Peleg | ........................ | F16B 7/04 403/236 |
| 5,297,890 A * | 3/1994 | Commins | ................. | F16L 3/12 403/384 |
| 5,478,041 A | 12/1995 | Mayne | | |
| 6,783,104 B1 * | 8/2004 | Roth | ...................... | F16B 7/0433 248/230.1 |
| 6,789,774 B2 | 9/2004 | Painchaud | | |
| 7,740,220 B2 * | 6/2010 | Jeanveau | ............ | E04H 12/2269 248/534 |

(Continued)

*Primary Examiner* — Nkeisha Smith
(74) *Attorney, Agent, or Firm* — Onello & Mello, LLP

(57) ABSTRACT

A clamp comprises a clamp band having a band surface. A first beam element is positioned at a first portion of the band surface. A second beam element is positioned at a second portion of the band surface. A mount includes a first portion and a second portion. A first portion of the mount is positioned at the first beam element opposite the first portion of the band surface. A second portion of the mount is positioned at the second beam element opposite the second portion of the band surface. A tightening mechanism is coupled to the first beam element and the second beam element that imparts a compressive force on the first and second beam elements. The compressive force in turn imparts an inward force at the band surface of the clamp band.

37 Claims, 38 Drawing Sheets

(56) References Cited

U.S. PATENT DOCUMENTS

| | | | |
|---|---|---|---|
| 8,376,289 B2* | 2/2013 | Heath | F16L 3/1207 |
| | | | 248/65 |
| 8,870,132 B2* | 10/2014 | Sampson | F16L 3/123 |
| | | | 248/65 |
| 9,115,506 B2* | 8/2015 | Hill | E04H 17/1417 |
| D769,707 S | 10/2016 | Roentz | |
| 9,656,622 B2* | 5/2017 | Lee | F16L 3/137 |
| 10,006,585 B2 | 6/2018 | Thomas et al. | |
| 10,107,419 B2* | 10/2018 | Anderson | F16L 3/14 |
| 10,668,878 B1* | 6/2020 | Sampson | B60R 16/08 |
| 10,772,400 B2 | 9/2020 | Booth | |
| 11,419,443 B2* | 8/2022 | Colin | F16M 13/022 |
| 2004/0046098 A1 | 3/2004 | Painchaud | |
| 2010/0299892 A1* | 12/2010 | Ardern | F16B 2/08 |
| | | | 24/481 |
| 2017/0299115 A1 | 10/2017 | Thomas et al. | |
| 2019/0017286 A1* | 1/2019 | Hossain | A01K 31/00 |
| 2019/0017652 A1* | 1/2019 | Hossain | A01K 39/0113 |
| 2019/0320769 A1 | 10/2019 | Booth | |
| 2021/0041068 A1 | 2/2021 | Ku et al. | |

\* cited by examiner

CLAMP SYSTEM

RELATED APPLICATIONS

This application claims the benefit of U.S. Provisional Application Ser. No. 62/186,913, filed May 11, 2021, the content of which is incorporated herein by reference, in its entirety.

BACKGROUND

A variety of devices have been used for the task of securing a typical patio umbrella to a fixed vertical surface such as a deck railing or post. They often involve some method of attaching to the support and then securing the umbrella pole. Typically, the method utilized for securing the pole involves trapping the pole in a larger hollow cylinder which has a screw element of some sort which presses into the pole. This method has the disadvantage of pressing into the pole at a relatively small point causing a point stress. This in turn, results in likely marking and/or causing deformation of that region of the pole causing dents and scratches.

The larger cylinder is typically not well-fitted to the pole, resulting in an unrefined look. Present systems are also typically constructed of materials that are not inherently rust or corrosion resistant throughout their makeup. As a result, after having repeated cycles of poles pushed through them, present systems tend to wear off their coatings and begin to deteriorate and rust.

Other present configurations employ a screw to press another element into the pole to fix the pole in place. These approaches still rely on concentrated forces over a relatively small area to achieve the central action of securing the pole. As a result, pole wear or deformation may result.

Many designs utilize a long hollow cylinder to prevent rotation in the other axis of the pole resulting in a rather large device. Some devices employ a multi-piece clamping mechanism with multiple hand knobs and plates to sandwich the support post(s) for support. These designs lack the aesthetics and efficiencies afforded by a more streamlined system and are typically complicated and difficult to manufacture and maintain.

SUMMARY

In systems and methods of the present inventive concepts, a pole is secured by virtue of an interference between a clamp band with a side surface of a pole material. In this manner, a pole is secured while mitigating damage to the pole.

In an aspect, a clamp comprises: a clamp band having a band surface; a first beam element at a first portion of the band surface; a second beam element at a second portion of the band surface; a mount, a first portion of the mount at the first beam element opposite the first portion of the band surface and a second portion of the mount at the second beam element opposite the second portion of the band surface; and a tightening mechanism coupled to the first beam element and the second beam element that imparts a compressive force on the first and second beam elements, the compressive force in turn imparting an inward force at the band surface of the clamp band.

In some embodiments, the first and second beam elements are positioned between the clamp band and the mount.

In some embodiments, the clamp band, first beam element, and second beam element are unitary.

In some embodiments, the clamp band, first beam element, second beam element, and mount are unitary.

In some embodiments, the first beam element comprises a first opening; the second beam element comprises a second opening; and the tightening mechanism comprises a carriage bolt and nut, the carriage bolt passing through the first and second openings.

In some embodiments, the nut is embedded in a thumb screw.

In some embodiments, the nut is integral with a thumb screw.

In some embodiments, at least one of the first opening and second opening is square and wherein the carriage bolt has a mating square neck portion dimensioned to be seated and retained in the square opening.

In some embodiments, the inward force imparts a frictional hold force on an inserted object.

In some embodiments, the clamp band surface is circular in cross-section other than an open region between the first portion and the second portion of the band surface In some embodiments, the clamp band surface is cylindrical other than an open region between the first portion and the second portion of the band surface.

In some embodiments, the clamp band surface extends more than 180 degrees about a center point of the clamp band surface.

In some embodiments, the clamp band surface extends more than 270 degrees about a center point of the clamp band surface.

In some embodiments, the compressive force of the tightening mechanism imparted on the first and second beam elements reduces a cross-sectional area of the clamp band.

In some embodiments, at least one of the first beam element and second beam element comprises a U-beam.

In some embodiments, the U-beam comprises a "U-shaped" cross-section comprising: a base; a first leg at a first end of the base; and a second leg at a second end of the base opposite the first leg, wherein the first and second legs are not parallel and lie at an acute angle relative to other.

In some embodiments, the tightening mechanism passes through an opening in the base of the U-beam.

In some embodiments, at least one of the first beam element and second beam element comprises a Z-beam.

In some embodiments, the Z-beam comprises a "Z-shaped" cross-section comprising: a base; a first leg at a first end of the base; and a second leg at a second end of the base opposite the first leg, wherein the first and second legs are not parallel and lie at an acute angle relative to other.

In some embodiments, the tightening mechanism passes through an opening in at least one of the first and second legs of the Z-beam.

In some embodiments, the compressive force of the tightening mechanism causes the first beam element and second beam element to interlock.

In some embodiments, the first beam element and second beam element each have first and second sidewalls that lie at acute angles relative to each other so that when they interlock under the compressive force of the tightening mechanism, an outward force is exerted through the first and second sidewalls of the beam elements.

In some embodiments: the clamp band extends in a longitudinal direction; a first portion of the first beam element interfaces with a first portion of the band surface at a first interface; and a first portion of the second beam element interfaces with a second portion of the band surface at a first interface.

In some embodiments, the first interface and second interface are linear and oriented in the longitudinal direction.

In some embodiments: the clamp band extends in a longitudinal direction; a first portion of the mount interfaces with a second portion of the first beam element at a third interface; and a second portion of the mount interfaces with a second portion of the second beam element at a fourth interface.

In some embodiments, the third interface and fourth interface are linear and oriented in the longitudinal direction.

In some embodiments, the first portion of the mount comprises a first mount extension leg and wherein the second portion of the mount comprises a second mount extension leg.

In some embodiments, the first portion of the mount further comprises a first mount foot and wherein the second portion of the mount further comprises a second mount foot.

In some embodiments, the first mount foot and second mount foot lie on first and second planes that are co-planar.

In some embodiments, the first mount foot and second mount foot lie on first and second planes that are perpendicular to each other.

In some embodiments, the first mount foot and second mount foot lie on first and second planes that are parallel to each other.

In some embodiments, the first mount foot includes at least one first mounting opening and wherein the second mount foot includes at least one second mounting opening.

In some embodiments, at least one of the first and second mounting openings is circular and the other of the first and second mounting openings is elongated.

In some embodiments, the mount comprises a mount clamp, the mount clamp comprising: a mount band having a mount band surface; a first mount beam element at a first portion of the mount band surface; a second mount beam element at a second portion of the mount band surface; the first mount beam element interfacing with the first beam element and the second mount beam element interfacing with the second beam element; and a mount tightening mechanism coupled to the first mount beam element and the second mount beam element that imparts a compressive force on the first and second mount beam elements, the compressive force in turn imparting an inward force at the band surface of the mount band.

In some embodiments, the mount tightening mechanism is independent of the clamp tightening mechanism.

In some embodiments, the mount tightening mechanism and clamp tightening mechanism are a same mechanism.

In some embodiments, the mount band, first mount beam element, and second mount beam element are unitary.

In some embodiments, the first mount beam element comprises a first opening; the second mount beam element comprises a second opening; and the mount tightening mechanism comprises a carriage bolt and nut, the carriage bolt passing through the first and second openings.

In some embodiments, the inward force of the mount band imparts a frictional hold force on an inserted object.

In some embodiments, the mount band surface is circular in cross-section other than an open region between the first portion and the second portion of the mount band surface.

In some embodiments, the mount band surface is square in cross-section other than an open region between the first portion and the second portion of the mount band surface.

In some embodiments, the clamp further comprises a quick release mechanism, the quick release mechanism comprising: a mounting plate constructed and arranged for coupling to a neighboring structure; and a seat at the mounting plate constructed and arranged for releasably securing the mount of the clamp.

In some embodiments, the seat comprises a slot constructed and arranged to receive portions of first and second feet of the mount of the clamp.

In some embodiments, the mounting plate quick release mechanism further comprises mounting holes dimensioned to receive mounting hardware.

BRIEF DESCRIPTION OF THE DRAWINGS

The foregoing and other features and advantages of the inventive concepts will be apparent from the more particular description of embodiments of the inventive concepts, as illustrated in the accompanying drawings in which like reference characters refer to the same parts throughout the different views. The drawings are not necessarily to scale, emphasis instead being placed upon illustrating the principles of the inventive concepts.

DETAILED DESCRIPTION OF EMBODIMENTS

Figure 1:
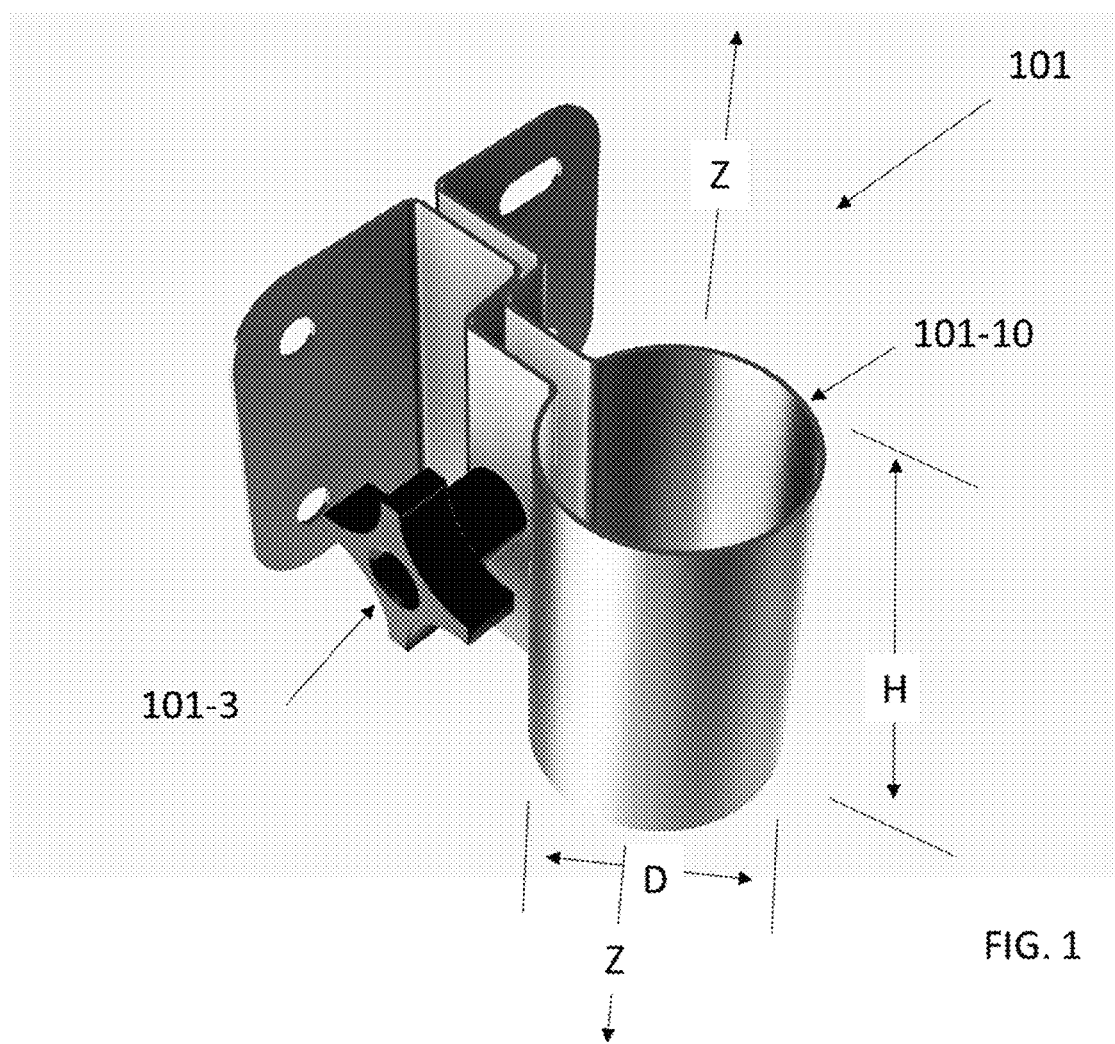
FIG. 1 is a perspective view of an embodiment of a Clamp in accordance with the present inventive concepts.

Various example embodiments will be described more fully hereinafter with reference to the accompanying drawings, in which some example embodiments are shown. The present inventive concepts may, however, be embodied in many different forms and should not be construed as limited to the example embodiments set forth herein.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. A first element may be said to be "transverse" to a second element if the first element has a direction of extension that is not parallel to the direction of extension of the second element.

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in such shapes.

FIG. 1 is a perspective view of an embodiment of a Clamp 101 in accordance with the present inventive concepts. In this embodiment, the clamp 101 includes a Clamp Body 101-10 and Tightening Mechanism 101-3. In the present embodiment, the Clamp Body 101-10 includes a Clamp Band, a First Beam Element, a Second Beam Element, and a Mount, as described herein. In this manner, the Clamp Body 101-10 comprises a formed metal shape with various sections and features. A Tightening Mechanism 101-3 comprises a system constructed and arranged to tighten the Clamp Body 101-10. In the present embodiment, the Tightening Mechanism 101-3 comprises a hand knob 101-3A, in the embodiment shown here, a four-pronged hand knob, and related hardware for constricting, or otherwise reducing the cross-sectional area of the clamp body.

Figure 2:
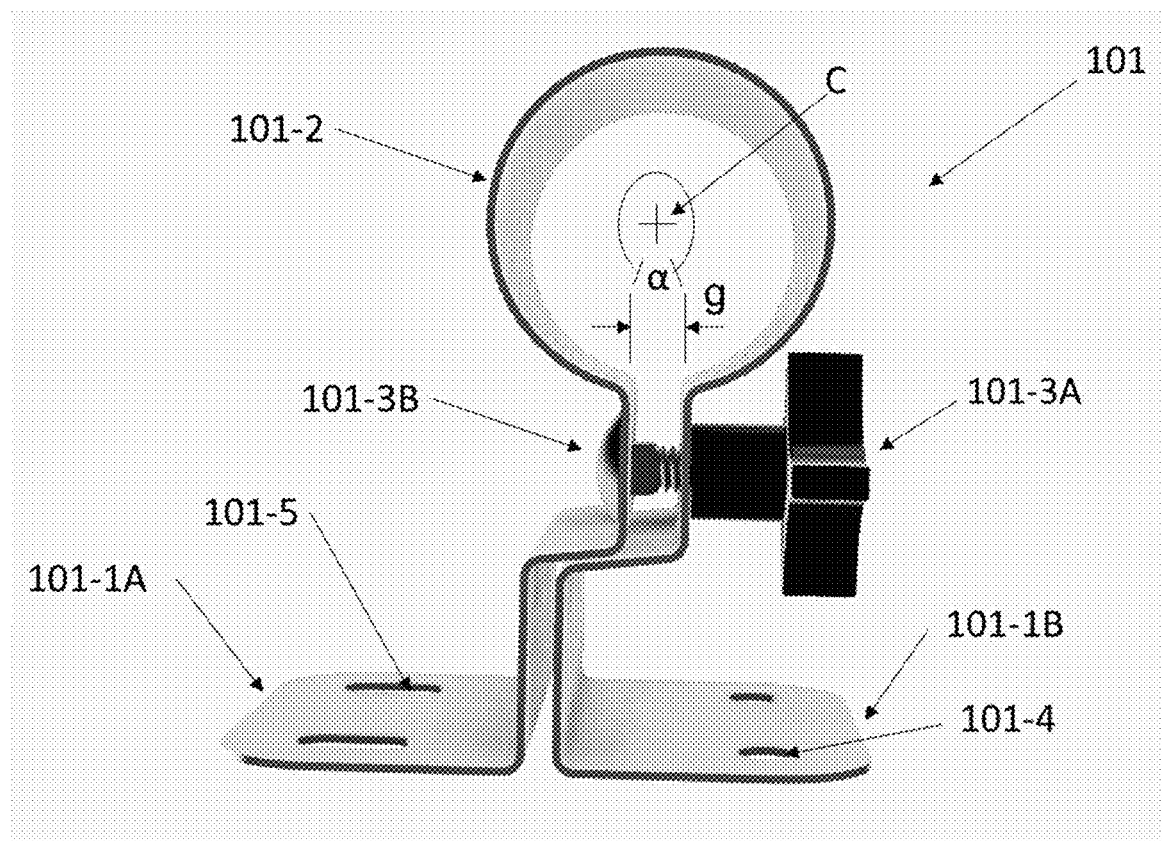
FIG. 2 is a perspective view of an embodiment a top view of a Clamp in accordance with the present inventive concepts

FIG. 2 is a perspective view of an embodiment a top view of a Clamp 101 in accordance with the present inventive concepts displaying various sections and features. A clamp band 101-2 comprises a cylindrical portion of the Clamp Body 101-10 which operates to tighten around an inserted pole as the Tightening Mechanism 101-3 is tightened. The Tightening Mechanism in the present embodiment comprises a hand knob 101-3A, in the embodiment shown here, a four-pronged hand knob, and a carriage bolt 101-3B. A Mount in the form of first and second Mounting Feet 101-1A, 101-1B comprises a pair of portions of the Clamp Body 101-10 arranged to fasten first and second portions of the Clamp 101 to one or more suitable structural elements. The Mounting Feet in the present embodiment are oriented perpendicular to the lateral axis of the clamp and optionally include at least one of holes 101-4 or slots 101-5 dimensioned to accept the body of a screw, for example a wood screw, or other fasteners to pass through. The slots 101-5 provide adjustability to widen or narrow the starting position of the Clamp Body 101-10.

Figure 3:
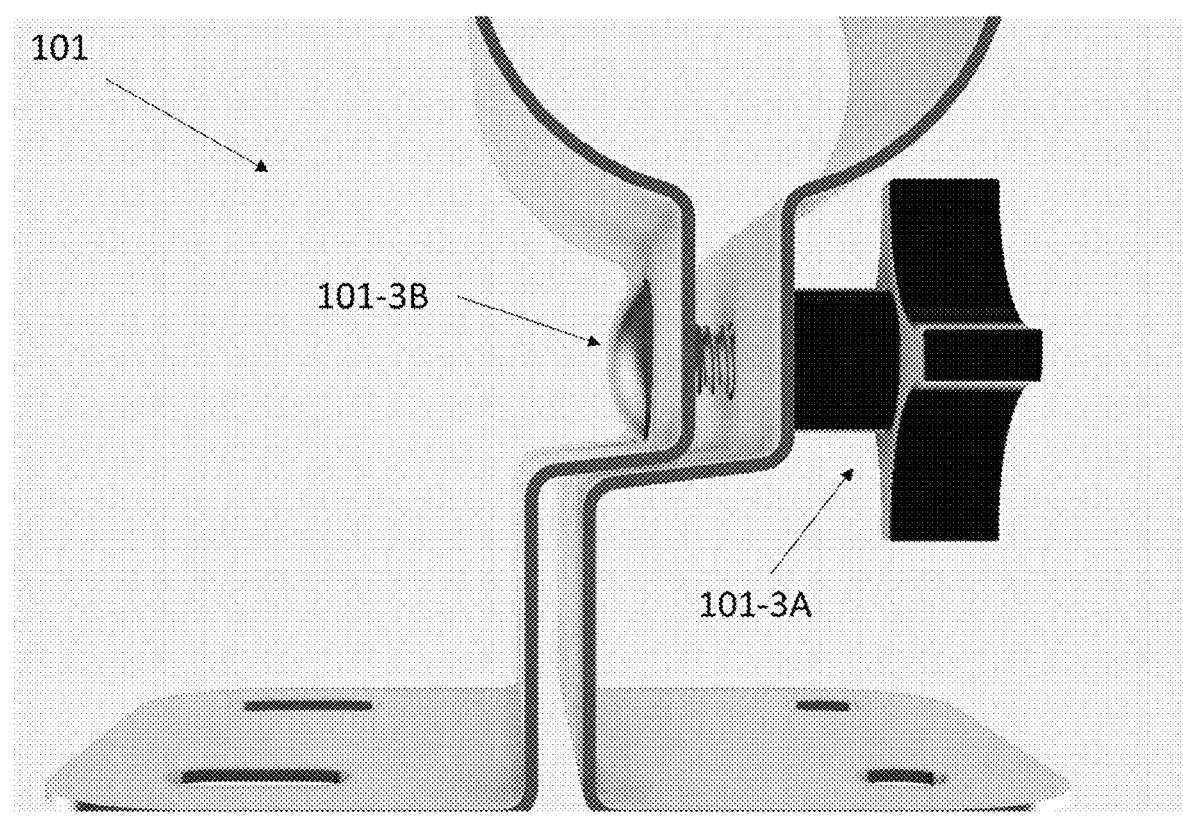
FIG. 3 is a close-up perspective view of an embodiment of a Clamp in accordance with the present inventive concepts.

FIG. 3 is a perspective view of an embodiment of a Clamp 101 in accordance with the present inventive concepts. A Tightening Mechanism 101-3 comprises a system constructed and arranged to tighten the Clamp 101. In the present embodiment, the Tightening Mechanism comprises a hand knob 101-3A, in the embodiment shown here, a four-pronged hand knob, containing an embedded threaded insert and a mating carriage bolt 101-3B. The hand knob 101-3A and mating carriage bolt 101-3B operate to constrict or otherwise reduce the cross-sectional area of the clamp body, and in particular the cross-sectional area of the clamp band 101-2. In other embodiments, the Tightening Mechanism 101-3 may comprise other mechanisms suitable for providing a tightening of the clamp body, including, but not limited to, a mating threaded screw and nut, a lever, a ratcheted mechanism and the like.

In the present embodiment, the Tightening Mechanism 101-3 utilizes a carriage bolt 103-3B and female threaded hand knob 103-3A. The carriage bolt 103-3B has a square protrusion just under the head which fits into a mating square hole 101-9 in the Clamp Body preventing its rotation as the hand knob is rotated. The square hole 101-9 can comprise a hole 101-9 for example of the type shown in FIG. 9.

Figure 4:
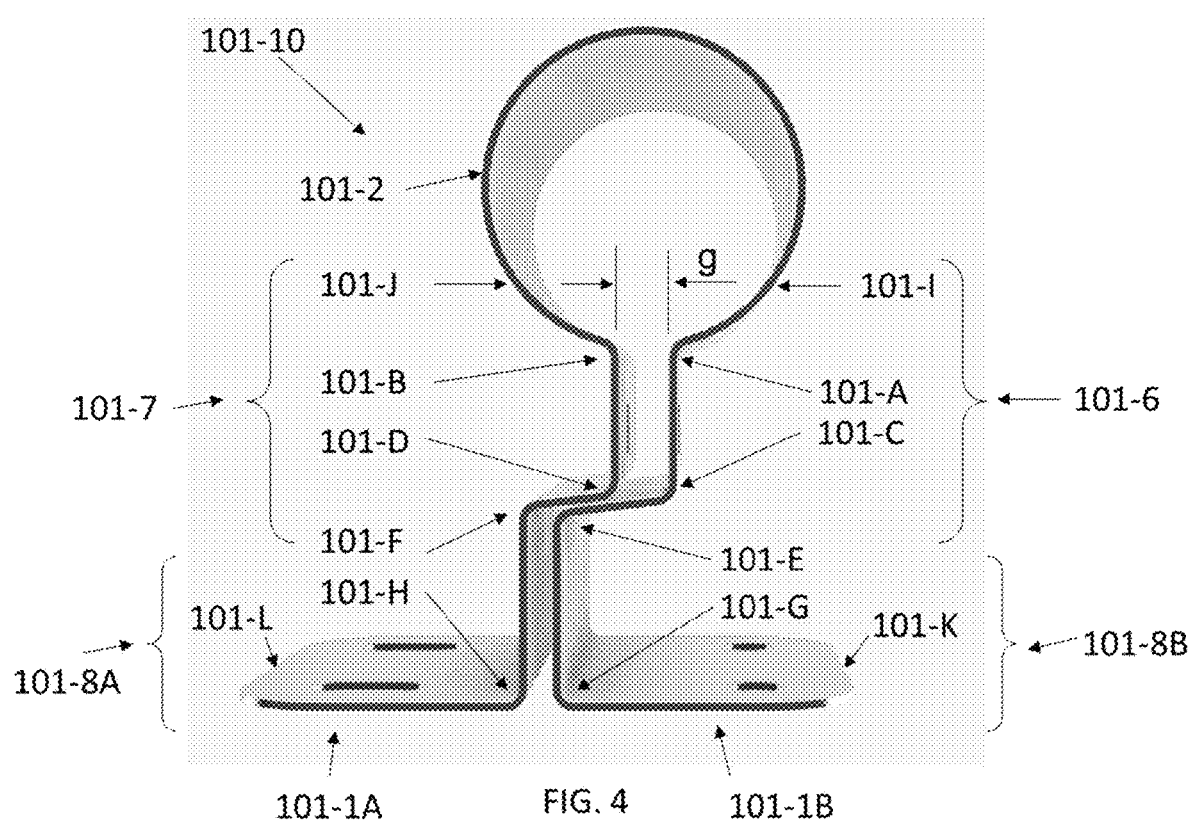
FIG. 4 is a perspective view of an embodiment of a clamp in accordance with the present inventive concepts.

FIG. 4 is a perspective view of an embodiment of a clamp 101 in accordance with the present inventive concepts. In the present embodiment, the Clamp Body 101-10 along with labelled points identifying the various bend locations of the portions of the body, which largely define the various sections, which define elements, which in turn serve various functions of the clamp 101. A U-Beam 101-7 (see FIG. 6) is defined herein to include portions of the of the Clamp Body 101-10 starting at bend 101-F, extending through bends 101-D, 101-B, and continuing to an approximate location of point 101-J on the Clamp Band. The U-Beam 101-7 is referred to herein as a "U-Beam", since its components generally form the shape of the letter "U" Similarly, the Z-Beam 101-6 (see FIG. 6) is defined herein to include portions of the Clamp Body 101-10 starting at bend 101-E, extending through bends 101-C, 101-A, and continuing to an approximate location of point 101-I on the Clamp Band. The Z-Beam 101-6 is referred to herein as a "Z-Beam", since its components generally form the shape of the letter "Z" The profile of the U-beam and Z-beam beam sections are representative of a typical U-channel and Z-channel profile giving relatively high strength in these elements along the height of the Clamp. This construction and arrangement creates strength to resist the local deformation of the Clamp Body material as the Tightening Mechanism pulls the two beam elements together. The construction and arrangement also leads to a configuration where force is distributed more uniformly throughout the height of the Clamp. The net effect is that an inserted umbrella pole is more uniformly restrained throughout the height of the Clamp Band cylinder rather than just being tight in a region of the pole proximal to the Tightening Mechanism.

Further definition of the portions of the Clamp Body is now described for the purpose of discussion are follows and will just refer to the suffix letters of the reference numeral prefix "101-" for simplicity. As discussed the U Beam 101-7 is defined as JBDF and the Z-Beam 101-6 is defined as LACE. With this convention in mind AC and BD are the beam bottoms or flats on which the Tightening Mechanism compresses. Leg FD and leg CE are representative of the angled sides of the two beams 101-7, 101-6 which interact with each other upon tightening of the Tightening Mechanism around an inserted pole.

In the present embodiment, a first mount 101-8A comprises an extension leg FH and mounting foot HL. Similarly, a second mount 101-8B comprises an extension leg EG and mounting foot GK. 1 The Extension Leg FH, EG operate to space the location of the clamp band 101-2 and its inserted pole relative to the position of the mounting feet 101-1A, 101-1B of the mounts 101-8A, 101-8B and the neighboring structural mounting surface.

Figure 5:
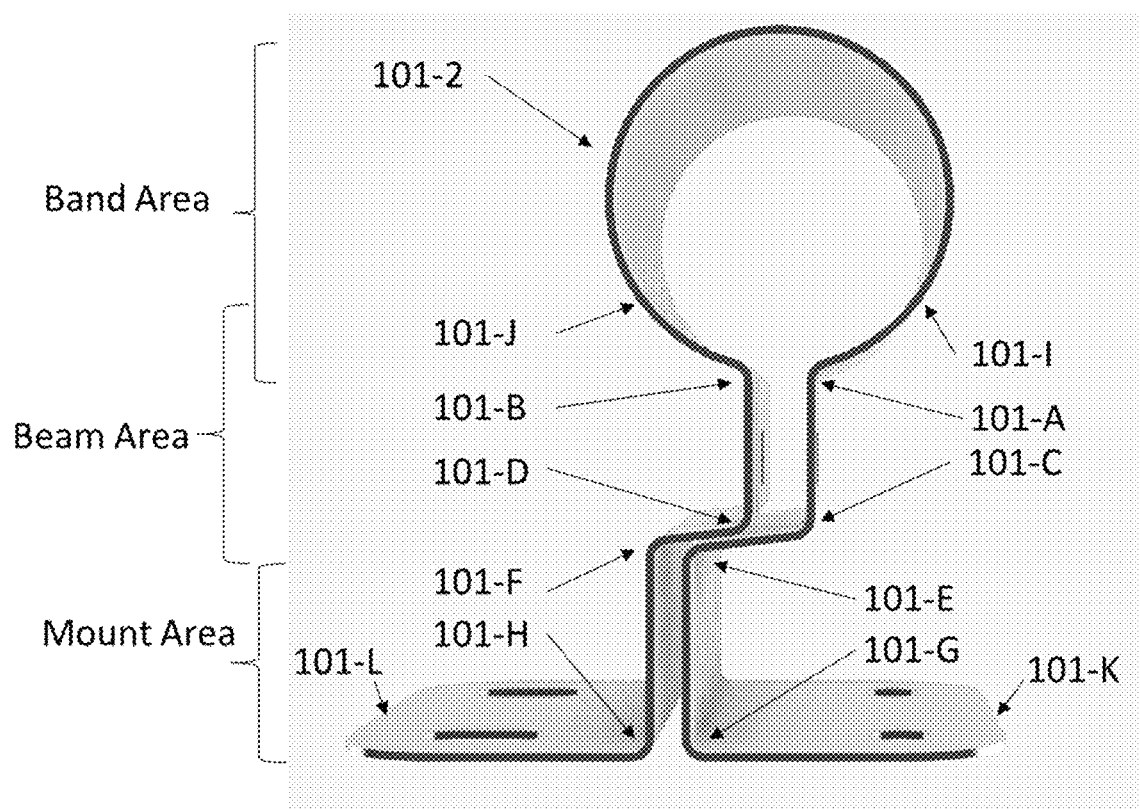
FIG. 5 is a perspective view of an embodiment of a Clamp identifying its primary regions in accordance with the present inventive concepts.

FIG. 5 is a perspective view of an embodiment of a Clamp 101 in accordance with the present inventive concepts. In the present embodiment, the Clamp can be summarized as comprising three elements, including, but not limited to The Clamp Band 101-2 as described herein, the Beam area as described herein, and the Mount area as described herein. In various embodiments, additional elements may be optionally included. In some embodiments, the Mount components may be varied to accommodate different geometries of mounting surfaces such as a corner mount or a side mount among others in addition to the flat mount shown. Similarly, the Beam components may utilize a different tightening mechanism, such as varieties of threaded knobs and/or nuts, carriage bolts, cam clamps, or other suitable mechanisms, which are suitable for tightening the opposing beam elements together. Additionally, in some embodiments, other geometries of beam elements can be employed that provide similar functionality but with similar or alternate advantages such as stiffening channels, stiffening ribs, and/or an alternate geometry providing functional benefits. A different Beam Area could be arranged to specifically accommodate a different Tightening Mechanism, which requires additional spacing and/or geometry to function properly.

Figure 6:
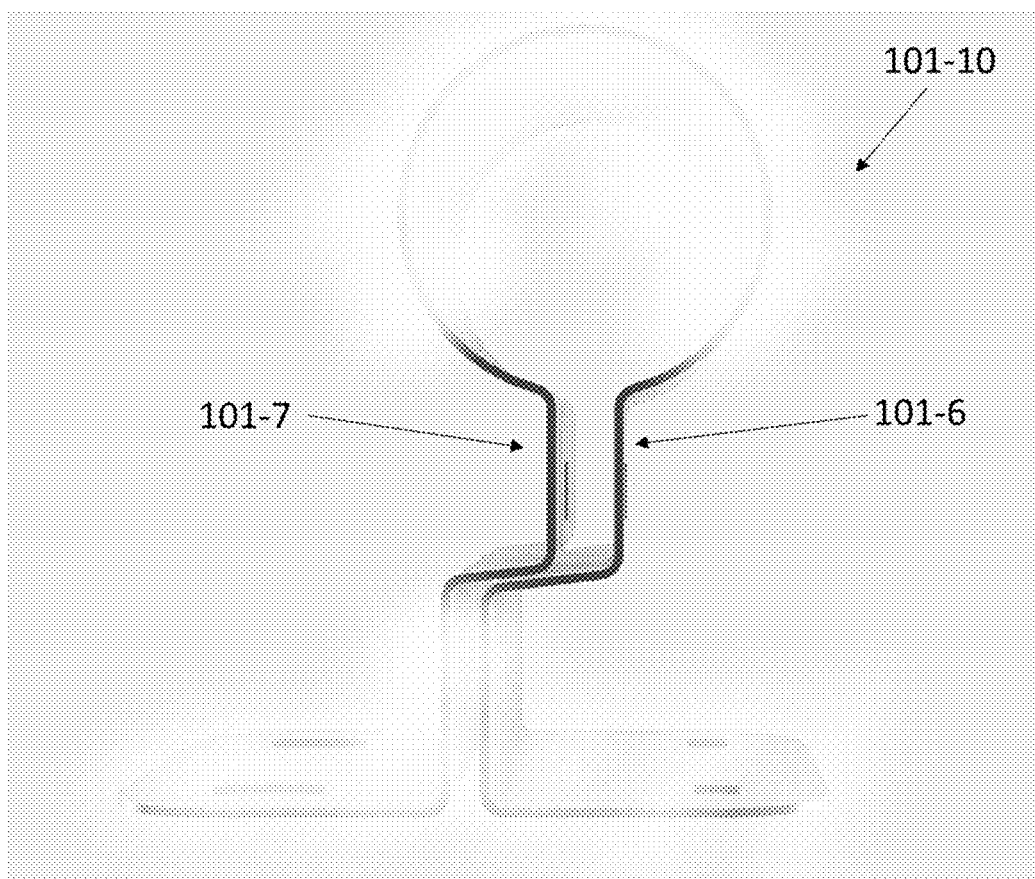
FIG. 6 is a perspective view of a clamp highlighting the clamp body in accordance with the present inventive concepts.

FIG. 6 is a perspective view of the Clamp Body of an embodiment of a clamp 101 in accordance with the present inventive concepts. In the present view, the Clamp Body 101-10 is depicted in a partially obscured view to highlight the beam element portions. The U-Beam 101-7 and Z-Beam 101-6 are shown. As described herein, in some embodiments, the Beam elements provide the rigidity along the height of the clamp. In some embodiments, the beam elements 101-7, 101-6 provide suitable geometry to accommodate a Tightening Mechanism 101-3, 101-3B. In some embodiments, the beam elements 101-7, 101-6 are positioned between, and connected to, both the Clamp Band 101-2 and the Mount 101-8A, 101-8B.

Figure 7:
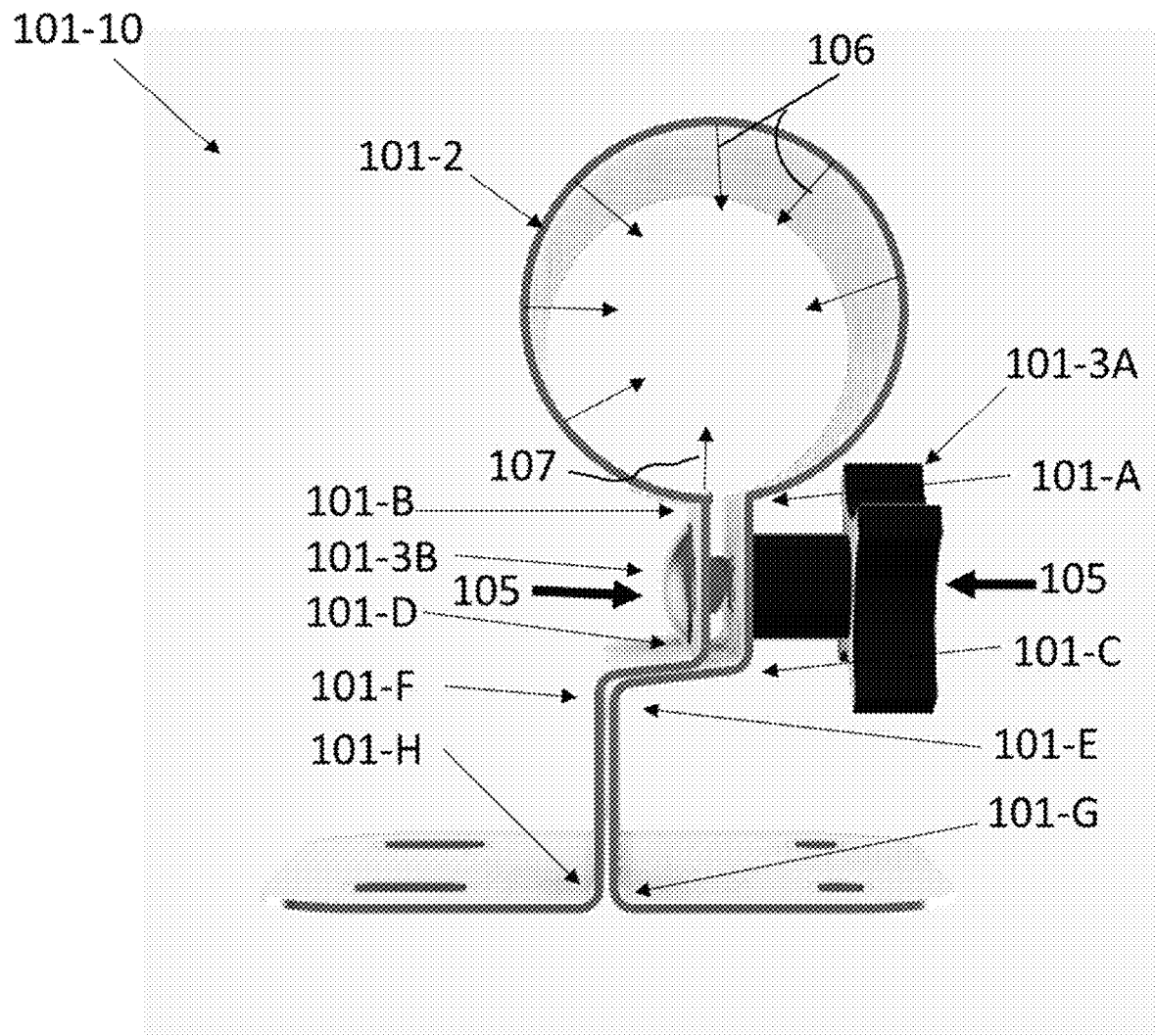
FIG. 7 is a perspective view of an embodiment of a clamp in accordance with the present inventive concepts.

FIG. 7 is a perspective view of an embodiment of a clamp 101 in accordance with the present inventive concepts. In the present embodiment, the Clamp Body 101-10 with the various portions as it would be in a tightened position. The identified points on the clamp are referred to simply using the suffix of the reference numeral for simplicity and paired to refer to a portion of the clamp body, for example Leg AC refers to the portion between points 101-A and 101-C. In this state the Z-Beam and the U-Beam are pulled closer together for example in the direction of arrows 105 under operation of the Tightening Mechanism reducing the gap g (see FIG. 4) between leg AC and leg BD. The reduction in the gap AC-BD tightens the Clamp Band around the pole as its circumference is reduced. This applies a hoop stress in the body of the Clamp Band 101-2 which in turn operates in a radial direction against the surface of an inserted pole uniformly around its circumference for example in the direction of arrows 106. The applied force combined with the mating surfaces grips an inserted pole with a high frictional resistance to movement. In the case of a slightly smaller pole diameter, further tightening of the Tightening Mechanism 101-3 can eventually cause leg FD to begin making contact with leg CE. The legs FD, CE are positioned at angle as shown such that continued tightening presses leg BD upwards into the Clamp Band 101-2 for example in the direction of arrow 107 which upward movement operates to press into the inserted pole. This action imparts a compressive force in leg BD and a tensile force in leg AC as they are wedged together. The combination of the tensile force in the Clamp Band as well as the potential wedged interaction between the U-Beam and the Z-Beam creates a tight and stiffened clamp around pole bodies that could be of varying diameters.

Figure 8:
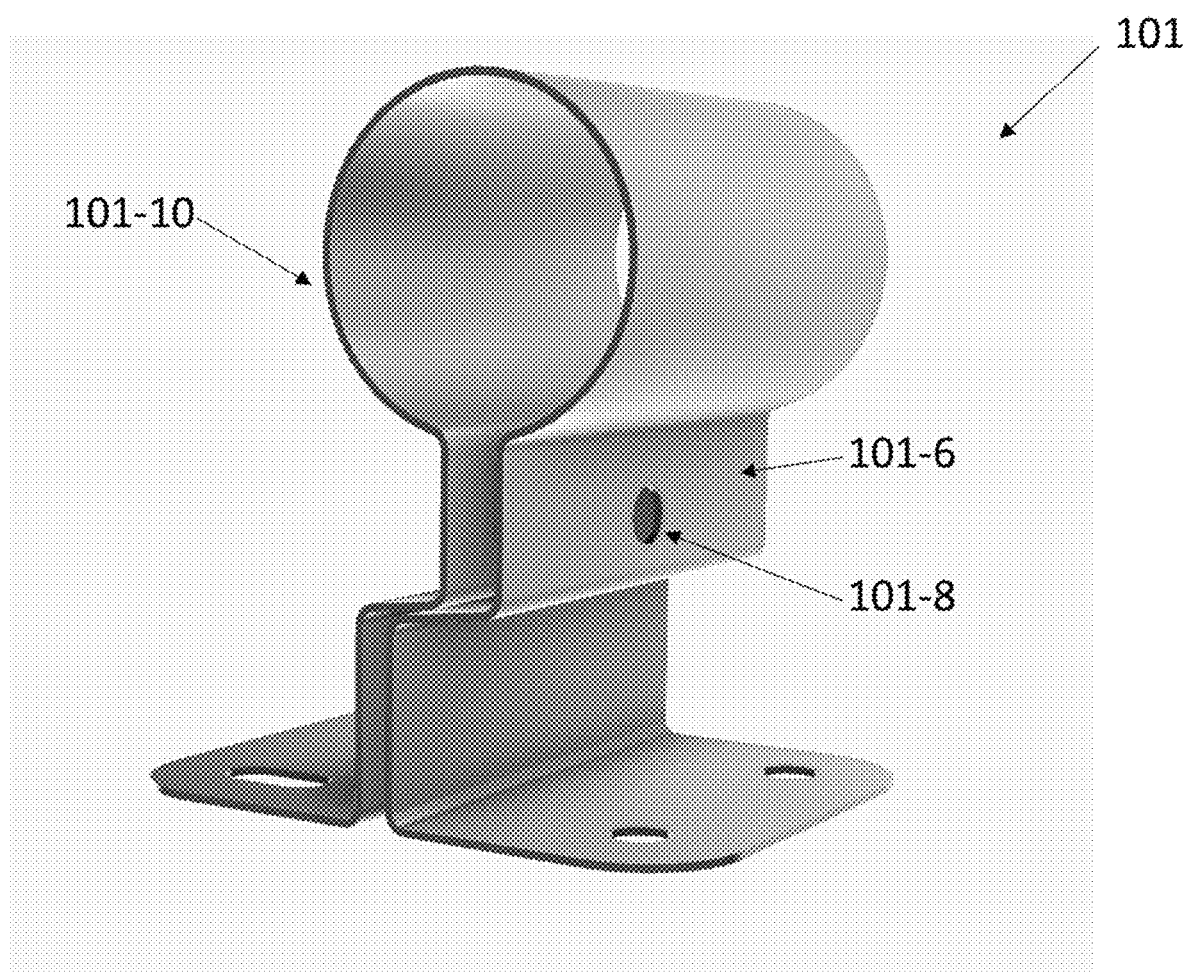
FIG. 8 is a rear perspective view of an embodiment of a Clamp in accordance with the present inventive concepts.

FIG. 8 is a perspective view of an embodiment of a Clamp 101 in accordance with the present inventive concepts. In the present embodiment, the Clamp Body 101-10 includes a round hole 101-8 through the Z-Beam 101-6 portion of the Clamp Body. As described herein, the hole 101-8 accommodates a shaft of a screw, carriage bolt, or similar Tightening Mechanism component.

Figure 9:
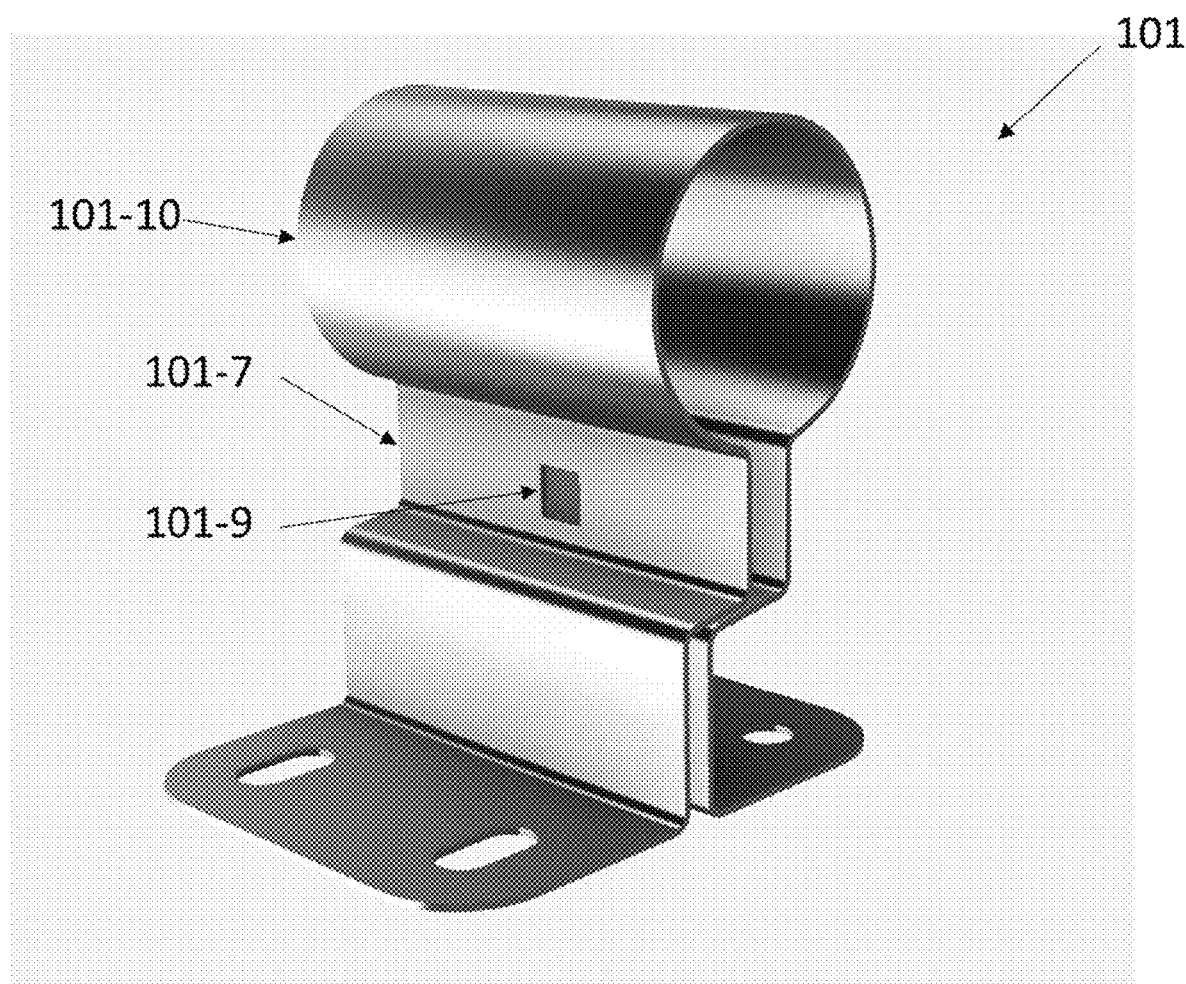
FIG. 9 is a front perspective view of an embodiment of a Clamp in accordance with the present inventive concepts.

FIG. 9 is a perspective view of an embodiment of a Clamp 101 in accordance with the present inventive concepts. In the present embodiment, the Clamp Body 101-10 includes a square hole 101-9 through the U-Beam 101-7 portion of the Clamp Body. As described herein, the square hole is constructed and arranged so that a typical carriage bolt with a square portion under the head can be inserted. The square profile prevents rotation of the carriage bolt along its axis.

In various embodiments, the positions of the square hole and round hole may be interchanged. In some embodiments, the U-Beam and Z-Beam may both include square holes so that the carriage bolt of the tightening mechanism can be positioned at either U-Beam or Z-Beam. In other embodiments, the U-Beam and Z-Beam may both include round holes.

Figure 10:
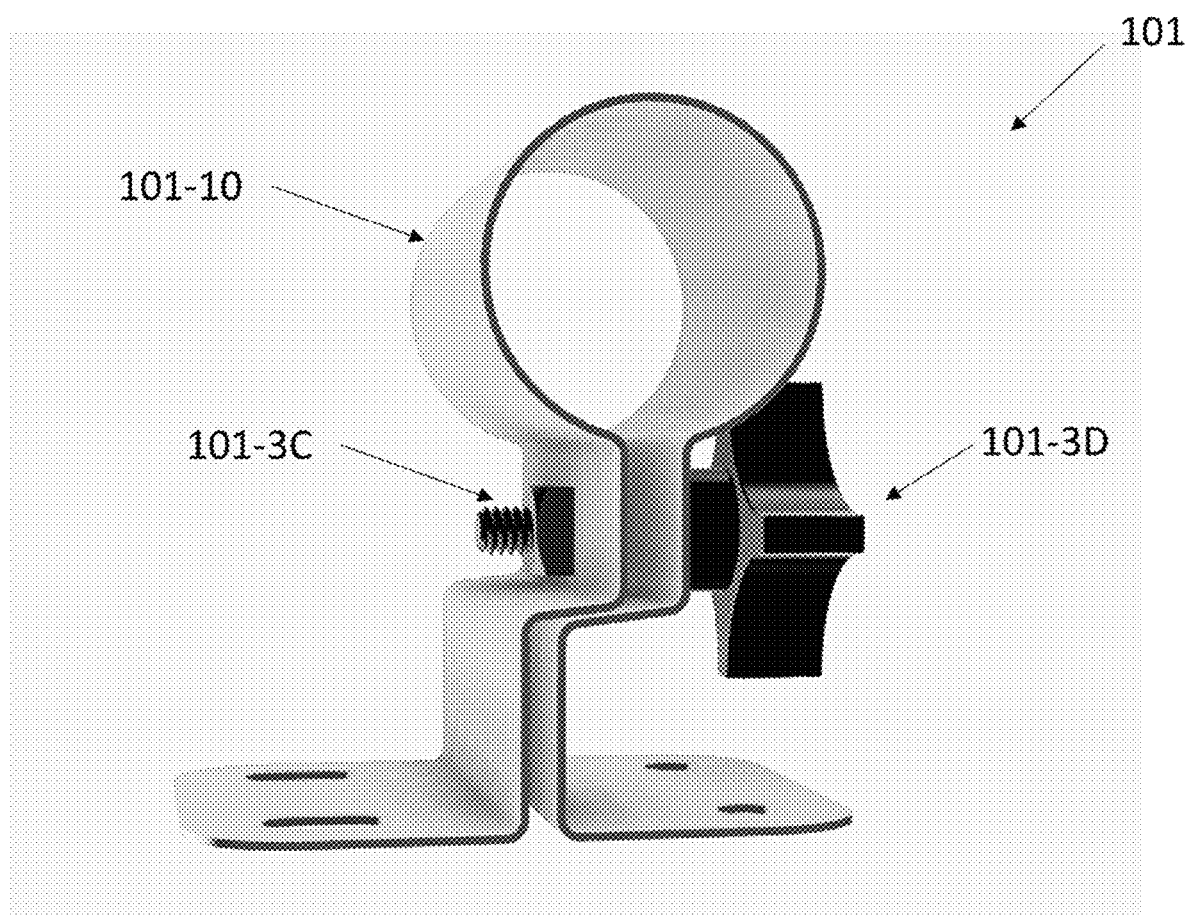
FIG. 10 is a perspective view of an embodiment of a Clamp illustrating a tightening device in the form of a hand-knob in accordance with the present inventive concepts.

FIG. 10 is a perspective view of an embodiment of a Clamp 101 in accordance with the present inventive concepts. In the present embodiment, a hand knob 101-3D, in the embodiment shown, a 4-pronged male stud hand knob Tightening Mechanism which utilizes a square nut 101-3C. The hand knob 101-3D has a threaded stud which protrudes through the holes in the Clamp Band 101-10 and is secured on the opposite side by the square nut 101-3C. In some embodiments, the positioning of the holes and the resulting placement of the nut near to the side of the U-Beam prevents the nut from rotating when the hand knob 101-3D is turned.

Figure 11:
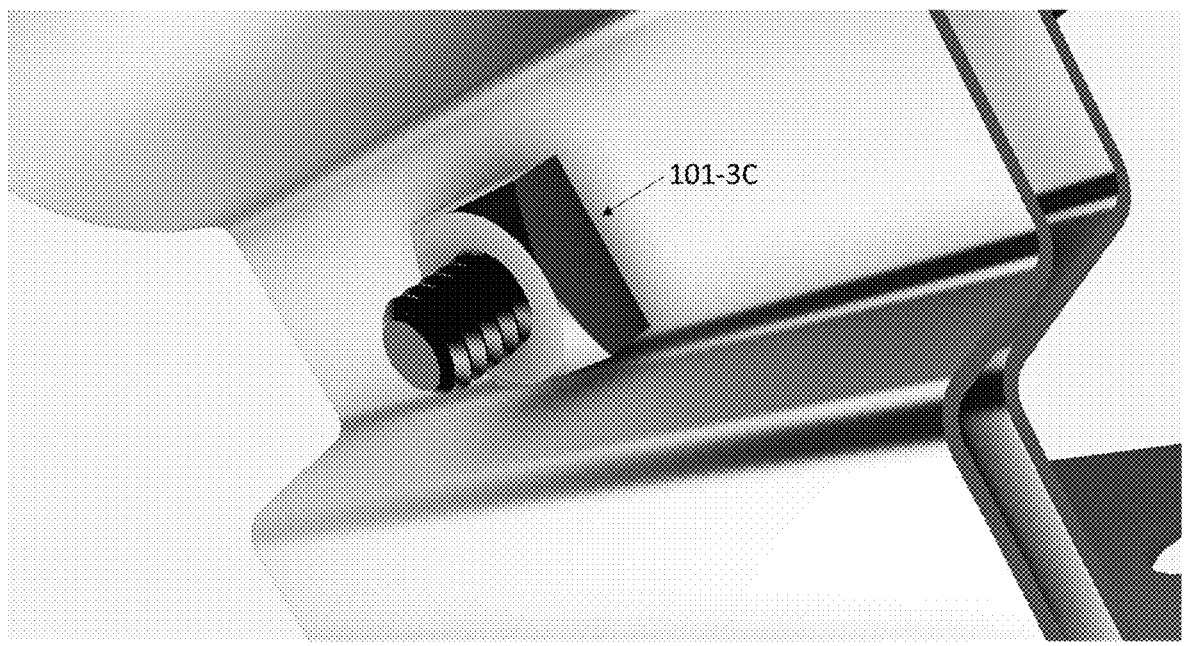
FIG. 11 is a close-up front perspective view of an embodiment of a Clamp in accordance with the present inventive concepts.

FIG. 11 is a perspective view of an embodiment of a Clamp 101 in accordance with the present inventive concepts. In the present embodiment, the placement of the square nut 101-3C arranged in the Tightening Mechanism relative to the legs of the U-Beam places the edge of the square nut very near to the side of the U-Beam preventing the nut from rotating during the tightening of the hand knob. The hand knob with the trapped nut allows for tightening of the Tightening Mechanism by hand without using tools.

Figure 12:
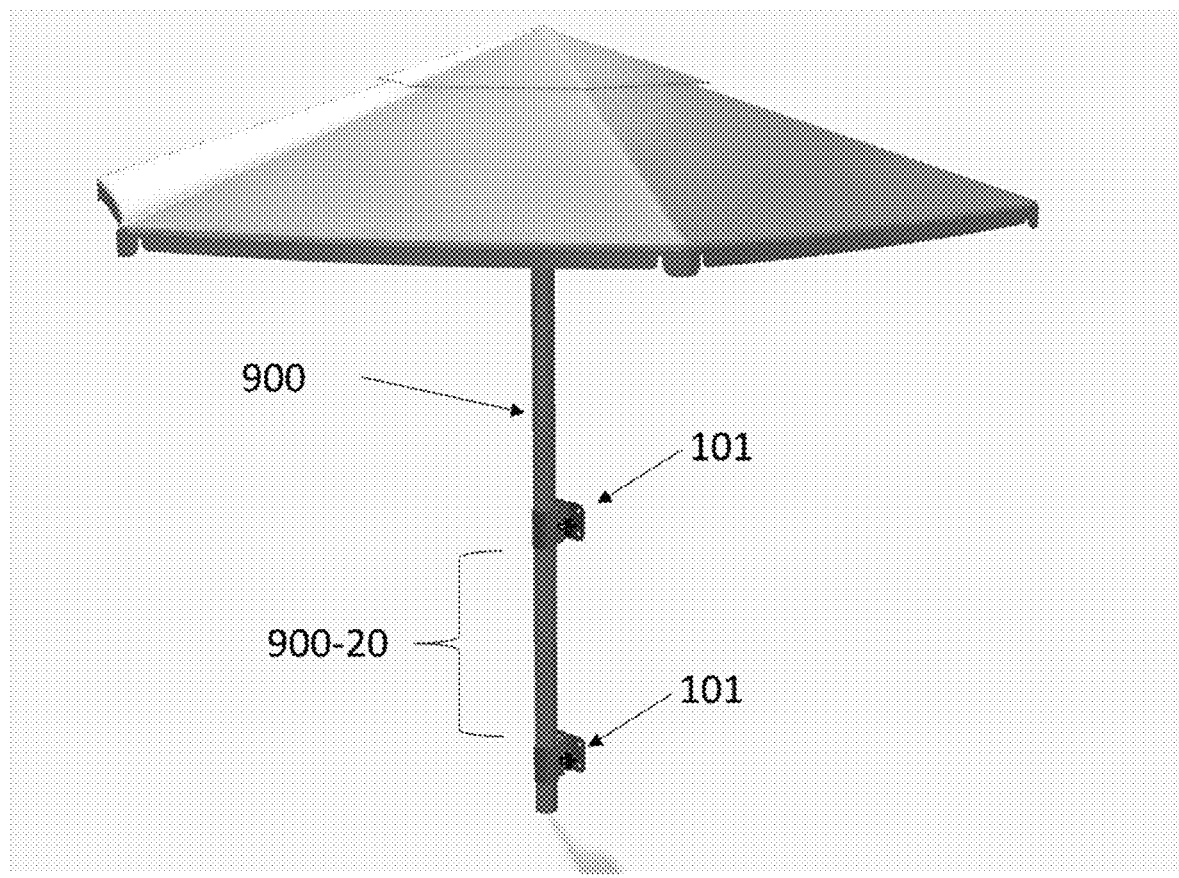
FIG. 12 is a front perspective view of an embodiment of a Clamp with mounted umbrella in accordance with the present inventive concepts.

FIG. 12 is a perspective front view of an embodiment of a Clamp 101 system being used to mount an umbrella pole in accordance with the present inventive concepts. In the present embodiment, a pair of Clamps 101 are attached to a patio umbrella pole 900. The clamps 101 are used in pairs with a distance between them 900-20 to allow for stability of the pole when mounted. This prevents external forces such as wind or other loads applied to the pole from moving, bending, or breaking the clamp mounts 101 or pole 900 were a single one to be utilized. The view is shown not mounted to a suitable support for the purpose of clarity.

Figure 13:
FIG. 13 is a rear perspective view of an embodiment of a Clamp with mounted umbrella in accordance with the present inventive concepts.

FIG. 13 is a perspective rear view of the embodiment depicted in FIG. 12

Figure 14:
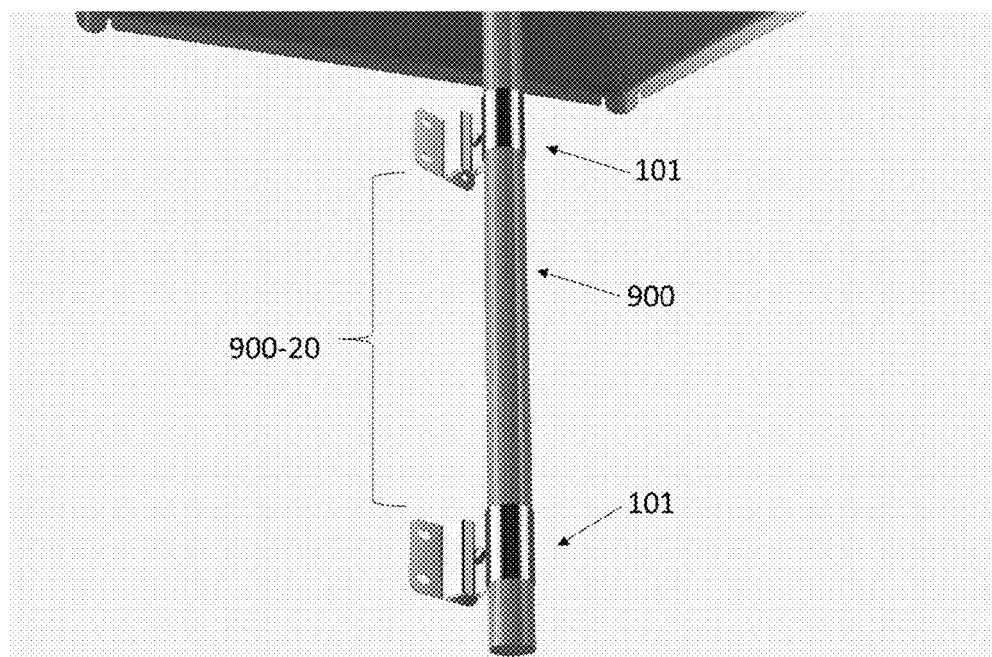
FIG. 14 is a close-up rear perspective view of an embodiment of a Clamp with mounted umbrella in accordance with the present inventive concepts.
Figure 15:
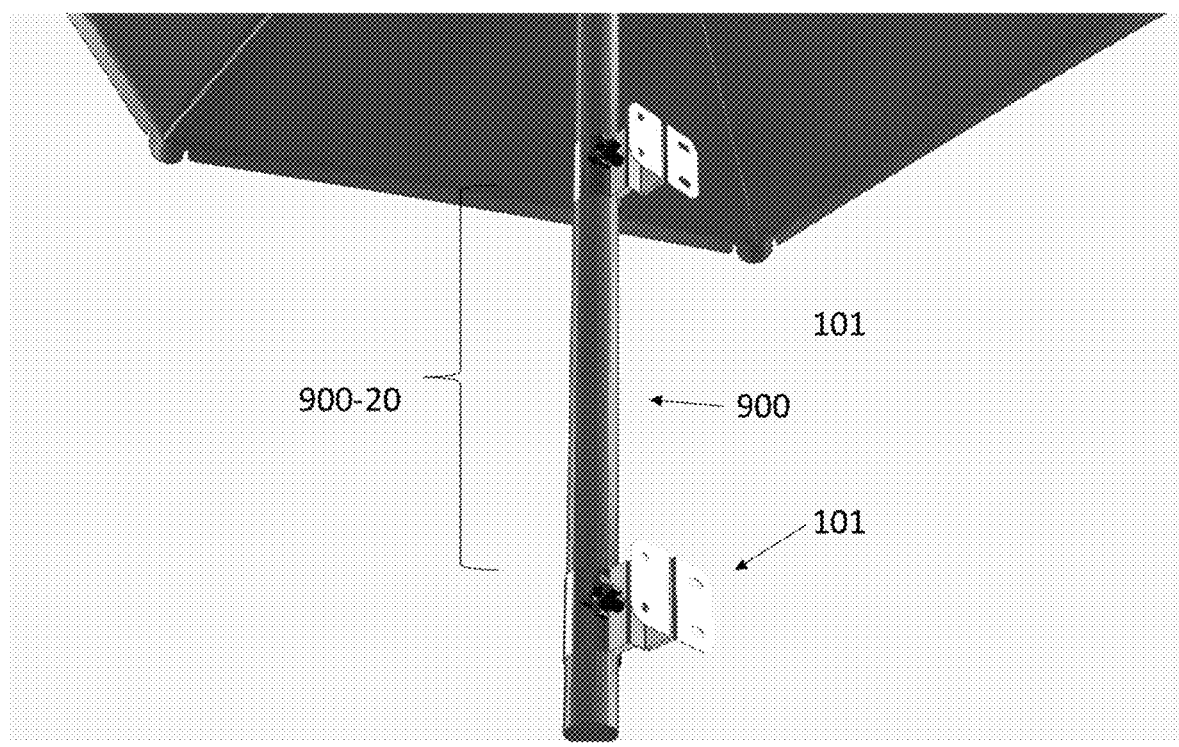
FIG. 15 is a close-up front perspective view of an embodiment of a Clamp with mounted umbrella in accordance with the present inventive concepts.

FIGS. 14 and 15 are a close-up perspective front and rear views of the embodiment depicted in FIGS. 12 and 13

Figure 16:
FIG. 16 is a perspective view of an embodiment of a Clamp mounting an umbrella to a deck in accordance with the present inventive concepts.

FIG. 16 is a perspective view of an embodiment of a Clamp 101 mounting an umbrella to a deck in accordance with the present inventive concepts. In the present embodiment, a pair of first and second Clamps 101 are attached to a patio umbrella pole 900 and to a deck rail post 910. The relative vertical spacing 900-20 between the first and second clamps 101 provides stability and strength by preventing possible rotation of the pole in the two axes perpendicular to the pole.

Figure 17:
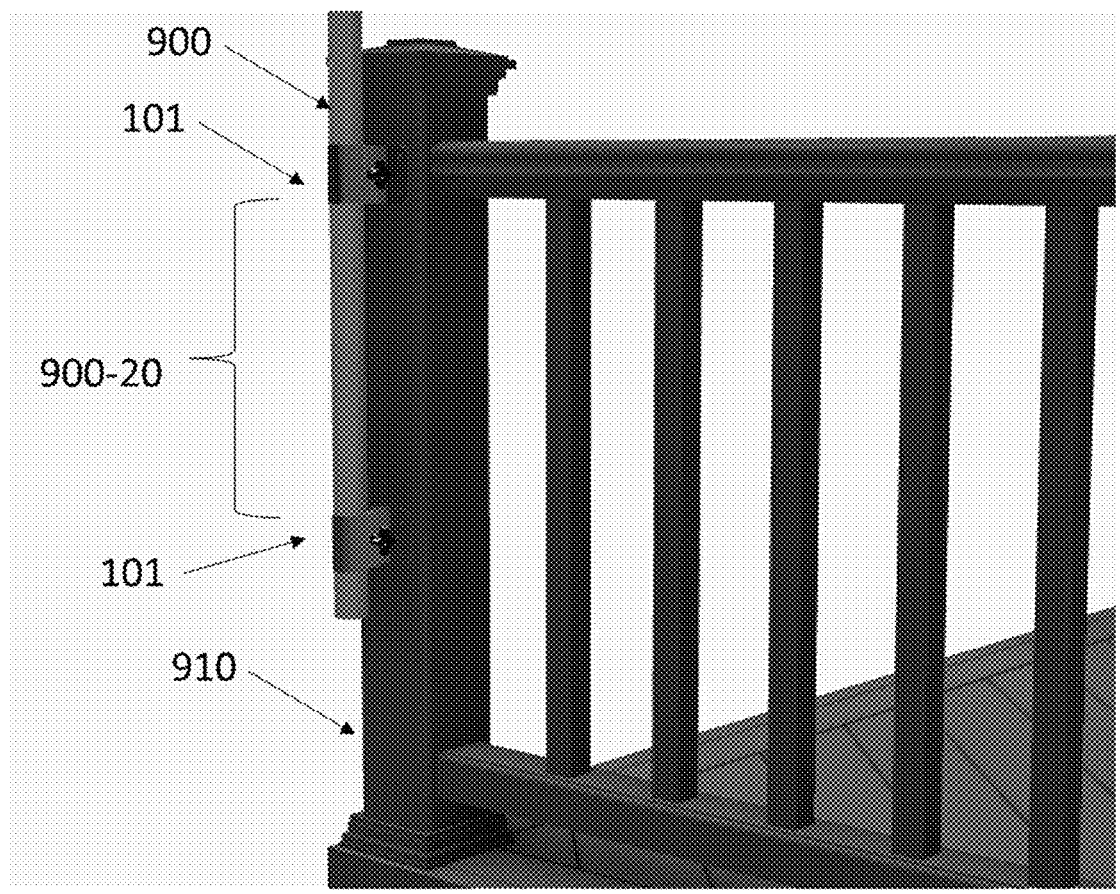
FIG. 17 is a close-up perspective view of an embodiment of a Clamp mounting an umbrella to a deck in accordance with the present inventive concepts.

FIG. 17 is a close-up perspective view of the embodiment of FIG. 16.

Figure 18:
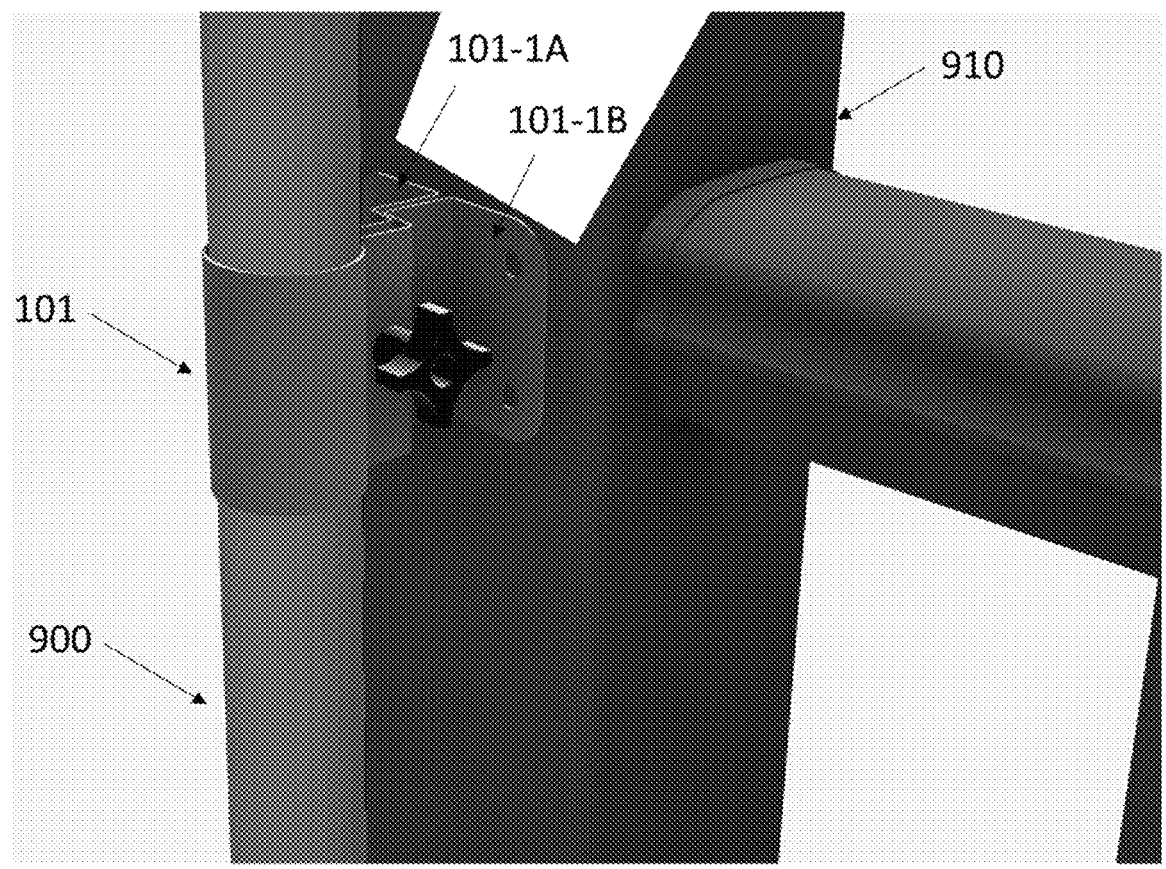
FIG. 18 is a further close-up perspective view of an embodiment of a Clamp mounting an umbrella to a deck in accordance with the present inventive concepts.

FIG. 18 is a perspective view of an embodiment of a Clamp 101 mounting an umbrella to a deck in accordance with the present inventive concepts. In the present embodiment, it can be seen that the Clamps 101 are arranged to attach a patio umbrella pole 900 to a deck rail post 910 with a flat mount arrangement as constructed and arranged as described herein. In a flat mount arrangement, the first and second mounting feet 101-1A are spaced apart from each other and extend in a same plane. In the present example, the first and second mounting feet 101-1A, 101-1B are anchored to a same surface of a deck rail post 910.

Figure 19:
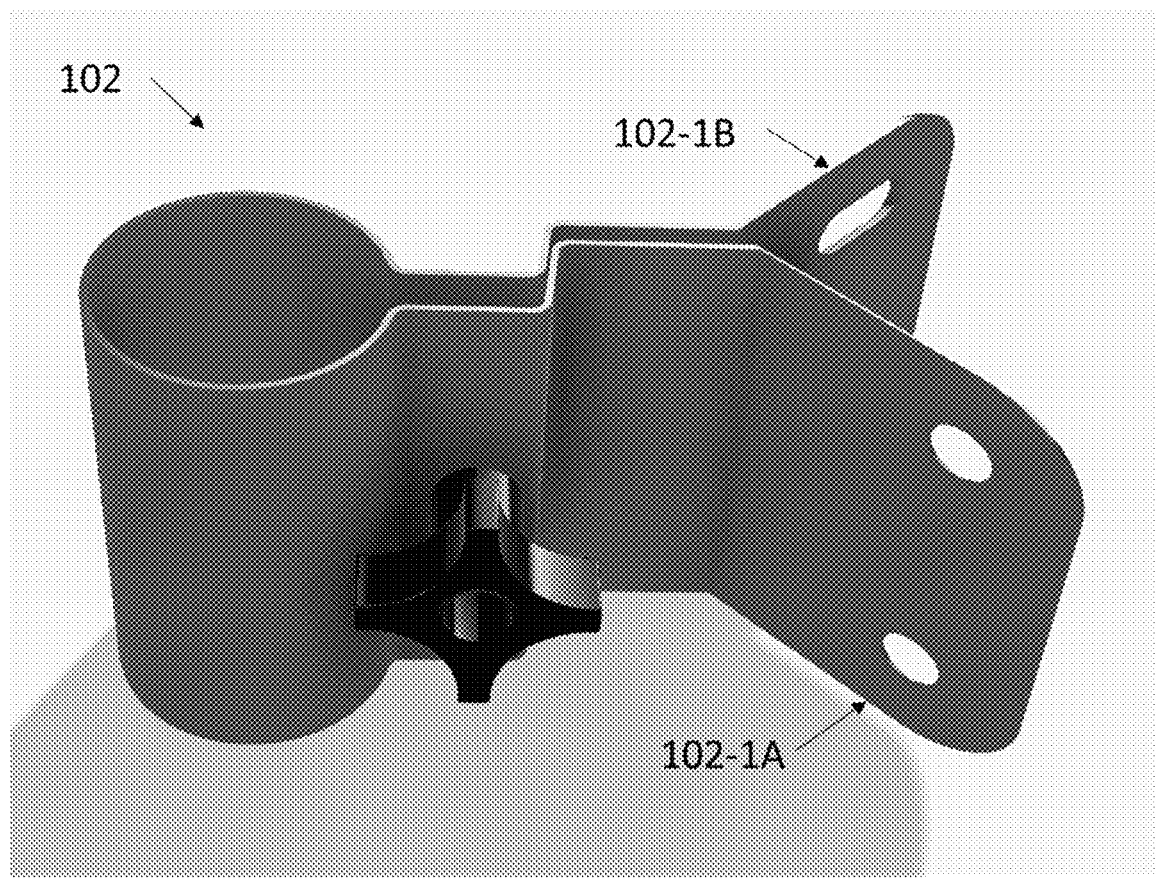
FIG. 19 is a front perspective view of another embodiment of a Clamp in accordance with the present inventive concepts.
Figure 20:
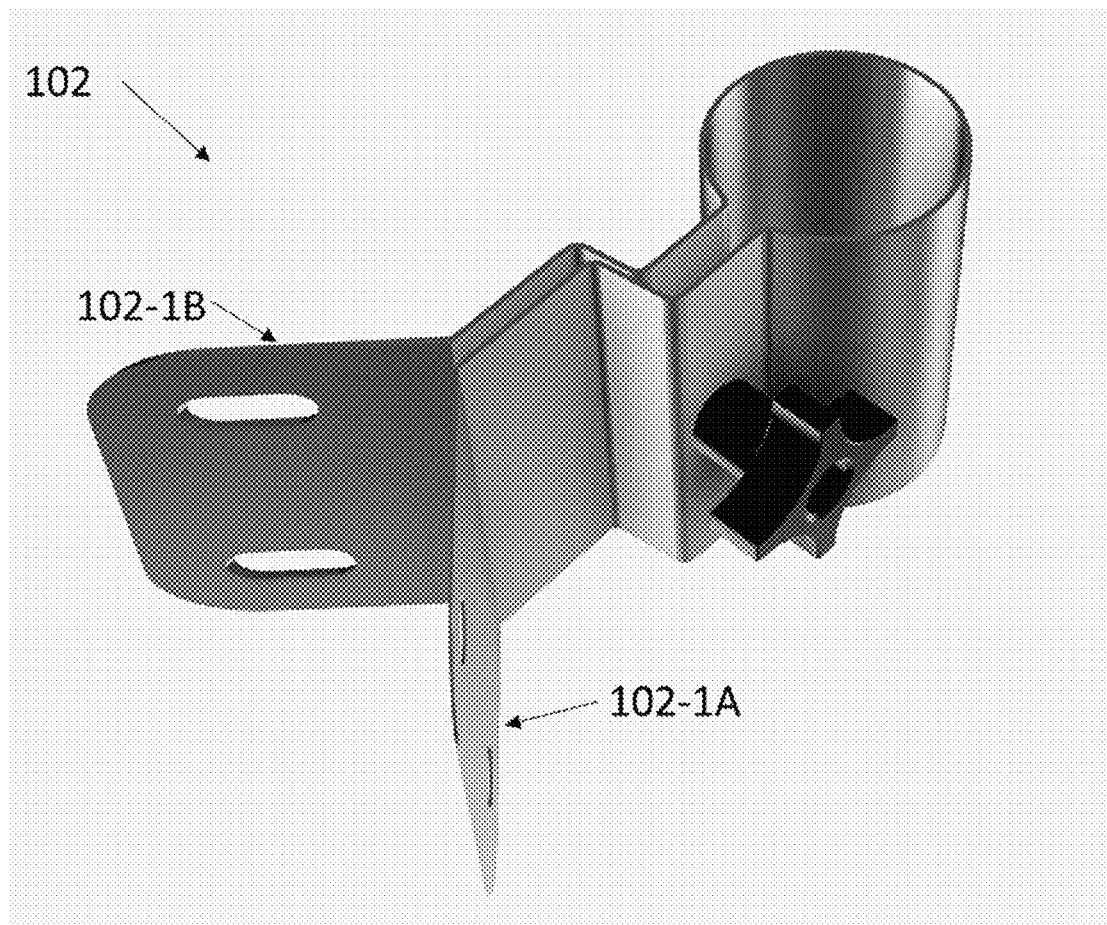
FIG. 20 is a rear perspective view of another embodiment of a Clamp in accordance with the present inventive concepts.

FIGS. 19 and 20 are a front perspective view and rear perspective view, respectively, of an embodiment of a Clamp 102 in accordance with the present inventive concepts. In the present embodiment, the Clamp 102 incorporates a corner mount of the mounting feet 102-1A, 102-1B. In the present example embodiment, the first and second mounting feet 102-1A, 102-1B are spaced apart from each other and lie on first and second respective planes that are oriented at a 90 degree angle relative to each other. In other words, they lie on planes that are perpendicular to each other. This configuration, for example, allows for mounting of the clamp to a corner of a suitable support, for example to a corner region of a support post in the form of a deck rail post 910. In the present embodiment, other features and elements of the clamp 102 are consistent with features and elements as described herein. Accordingly, further description of the consistent features and elements are not further described for the purpose of brevity.

Figure 21:
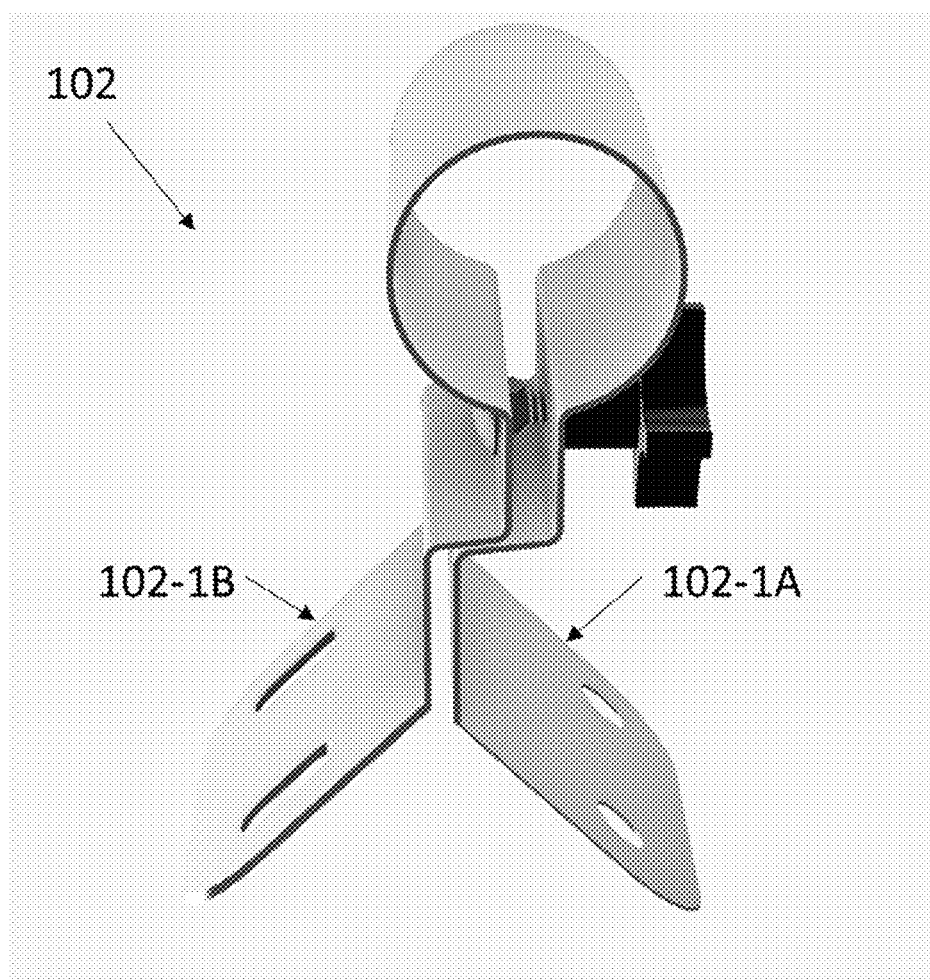
FIG. 21 is a top perspective view of another embodiment of a Clamp in accordance with the present inventive concepts.

FIG. 21 is a top perspective view of an embodiment of a Clamp 102 of FIGS. 19-20 in accordance with the present inventive concepts.

Figure 22:
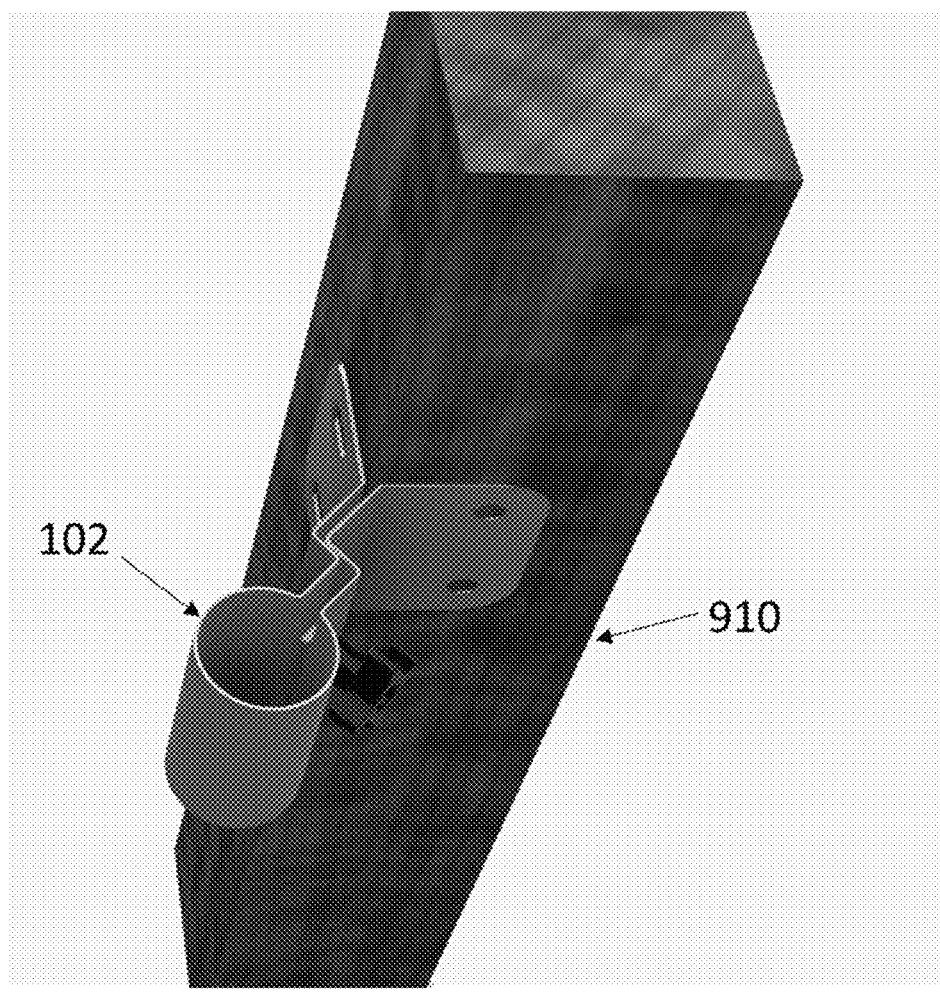
FIG. 22 is a perspective view of another embodiment of a Clamp mounted to a support post in accordance with the present inventive concepts.

FIG. 22 is a top perspective view of an embodiment of a Clamp 102 of FIGS. 19-21 in accordance with the present inventive concepts. In the present embodiment, corner mount of the Clamp 102 is shown fastened to corner regions of a support post 910. As described herein, in other embodiments, the Clamp 102 can be arranged in pairs spaced apart by a vertical spacing 900-20 (see FIGS. 16, 17) for enhanced function. In the present embodiment, other features and elements of the clamp 102 are consistent with features and elements as described herein. Accordingly, further description of the consistent features and elements are not further described for the purpose of brevity.

Figure 23:
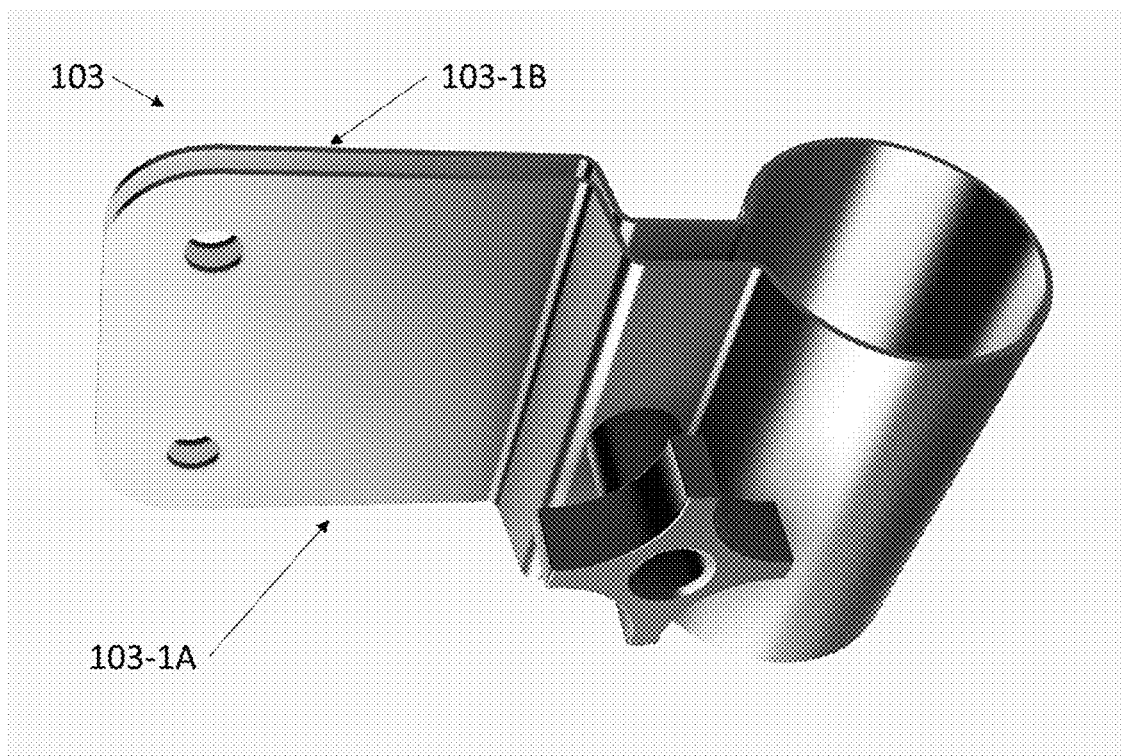
FIG. 23 is a perspective view of another embodiment of a Clamp in accordance with the present inventive concepts.

FIG. 23 is a perspective view of an embodiment of a Clamp 103 in accordance with the present inventive concepts. In the present embodiment, the Clamp 103 mounting system is constructed and arranged for an edge mount. In the present example embodiment, the first and second mounting feet 103-1A, 103-1B are spaced apart from each other and lie on first and second respective planes that are parallel to each other. This embodiment is shown with a hand knob Tightening Mechanism as described herein. The Mount area is comprised of two parallel flat plates extending from the Beam area parallel to each other. This is mounted on a flat edge of a support post utilizing a screw fastener or similar through the holes in the Mounting Feet 103-1A, 103-1B.

Figure 24:
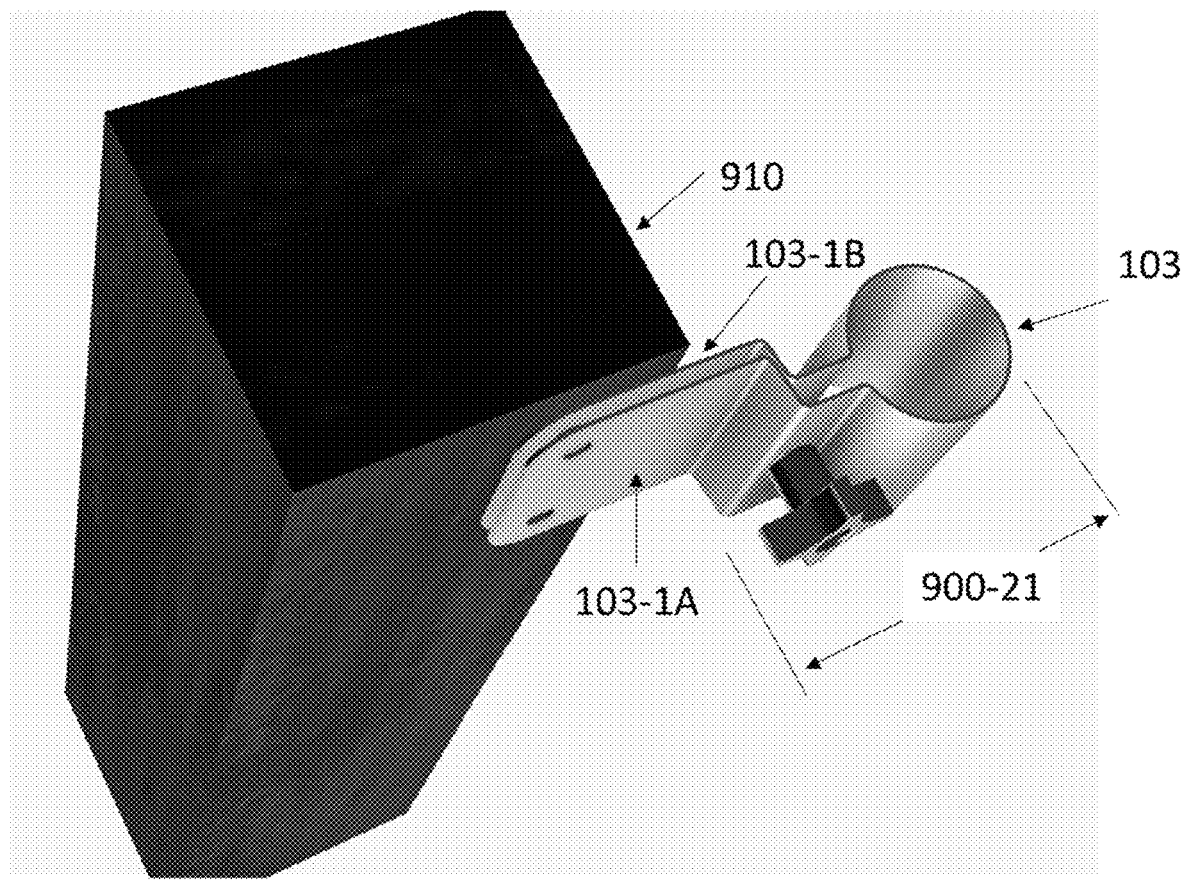
FIG. 24 is a perspective view of another embodiment of a Clamp mounted to a support post in accordance with the present inventive concepts.

FIG. 24 is a perspective view of an embodiment of a Clamp 103 in accordance with the present inventive concepts. In the present embodiment, the Clamp mounting feet 103-1A, 103-1B are parallel allowing an edge mount to a deck post 910 as described herein. In the present embodiment, edge mount of the Clamp 103 is shown fastened to an edge region of a support post 910. An advantage of the edge mount is that it provides a user flexibility in determining an appropriate spacing 900-21 from a center of an inserted pole to an edge of the post 910 by adjusting the position of the clamp mounting feet 103-1A, 103-1B relative to the edge of the post 910. As described herein in connection with other embodiments, the Clamp 103 can be arranged in pairs spaced apart by a vertical spacing 900-20 (see FIGS. 16, 17) for enhanced function. In the present embodiment, other features and elements of the clamp 103 are consistent with features and elements as described herein. Accordingly, further description of the consistent features and elements are not further described for the purpose of brevity.

Figure 25:
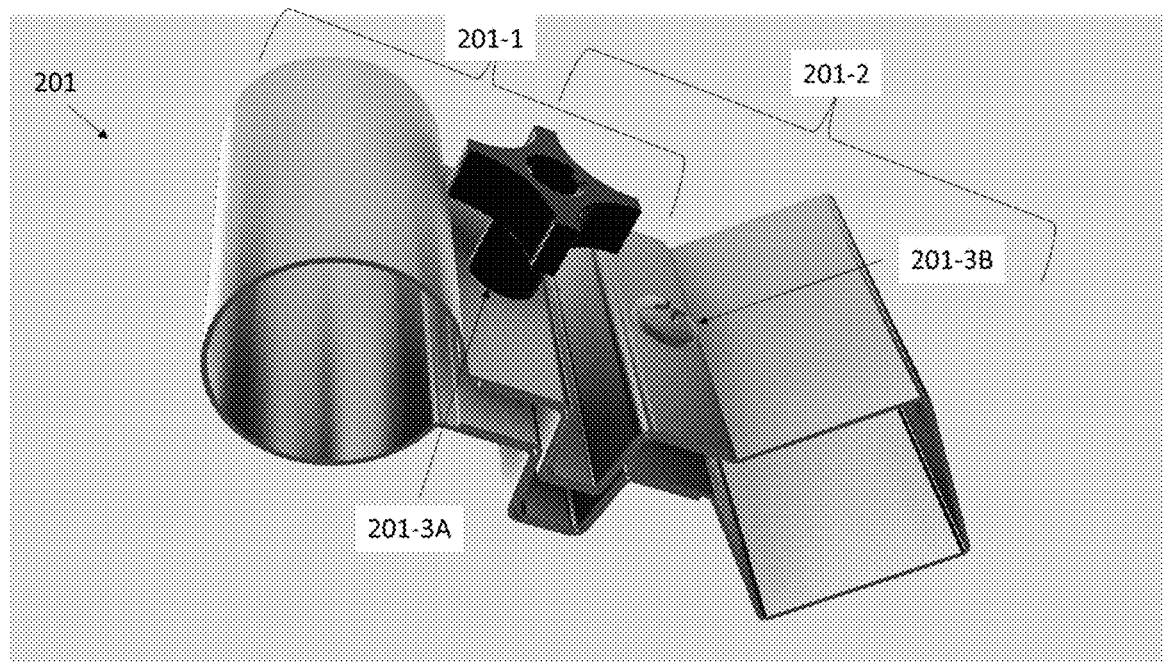
FIG. 25 is a perspective view of another embodiment of a Clamp in accordance with the present inventive concepts.

FIG. 25 is a perspective view of an embodiment of a Clamp 201 in accordance with the present inventive concepts. In the present embodiment, The Clamp employs two similar but separate or otherwise independent sections which overlap in order to interlock. Rather than a mounting foot as described herein in other embodiments, the mounting system for this embodiment employs a second clamp band, which can tighten around another straight element to serve as the suitable mounting surface. Accordingly, the clamp 201 of the present embodiment comprises a first clamp 201-1 referred to herein as a "pole clamp" and a second clamp 201-2 referred to herein as a "mounting clamp" In the present embodiment, the mounting clamp 201-2 is dimensioned to a square spindle of a deck railing. In the present embodiment, other features and elements of the clamp 201 are consistent with features and elements as described herein. Accordingly, further description of the consistent features and elements are not further described for the purpose of brevity. The present embodiment of the clamp 201 employs a first tightening mechanism 201-3A in the form of a mating carriage bolt and hand knob 201-3A and a second tightening mechanism 201-3B comprising a bolt and seated square nut, as described herein. In some embodiments, the second tightening mechanism 201-3B can be fixed to securely mount the mounting clamp 201-2 to a spindle, and the first tightening mechanism 201-3A can be readily adjusted to positing an inserted pole.

Figure 26:
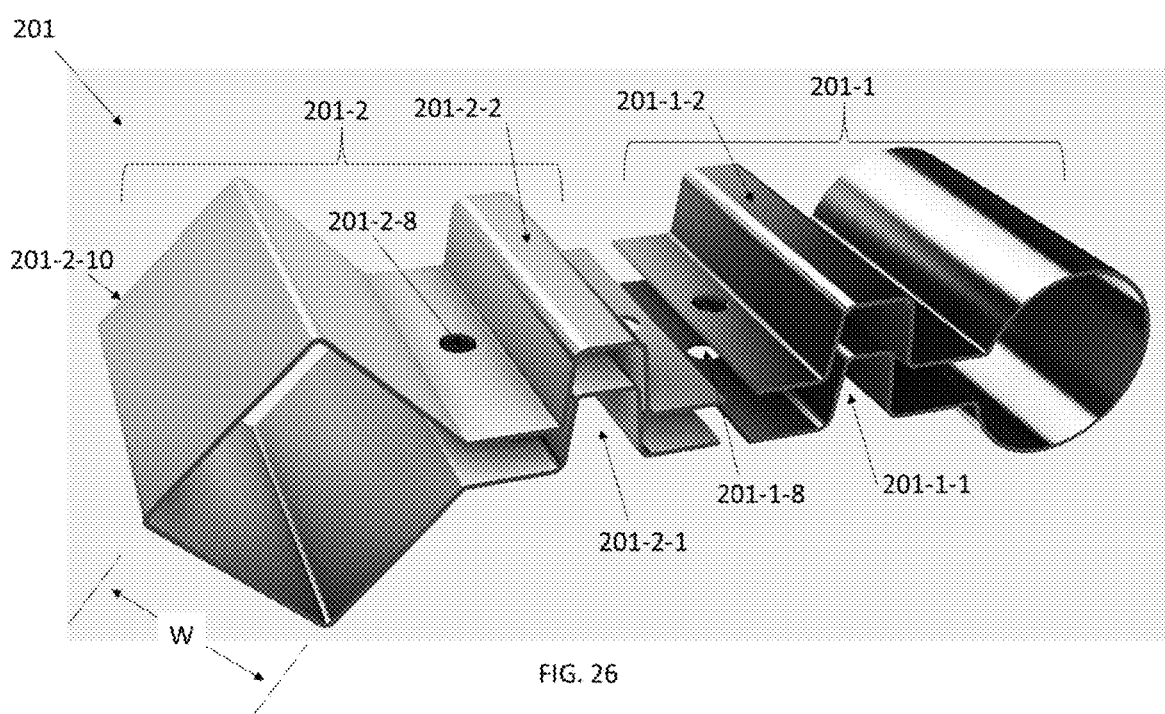
FIG. 26 is a perspective view of another embodiment of a Clamp in accordance with the present inventive concepts.

FIG. 26 is an exploded perspective view of the embodiment of FIG. 25. A Clamp 201 in accordance with the present inventive concepts comprises dual-body components including the mounting clamp 201-2 and the pole clamp 201-1. The Mount Body 201-2 is dimensioned to clamp around a supporting spindle. In the present embodiment, the Clamp Body 201-1 clamps around the pole as in other embodiments as described herein. The U-shaped channels in both the mounting clamp body and the pole clamp body are constructed and arranged to interlock at mating common portions of their respective U-Beam and Z-Beam elements and are sized so that the channels of the mounting clamp 201-2 portion can overlap the channels of the pole clamp 201-1 portion. The two tightening mechanisms not only effectively clamp the Clamp Band and Mount Band tightly around their respective pole/post elements, but also compress the sandwiched and interlocked U-Channel elements together. This interlocked U-Channel sandwich along with the two tightening mechanisms effectively locks the Clamp Body to the Mount Body by providing stability in all three axes. The two tightening mechanisms 201-3A, 201-3B also pass through four layers of material as the Bodies are tightened. The mounting clamp 201-2 can be installed on the mounting surface by spreading apart the legs around the spindle until it is engaged in the square profile mounting band 201-2-10 of the mounting clamp 201-1. Then the Clamp Body is attached to the Mount Body by spreading open the legs of the Clamp Body to get its U-Channels to engage with and capture the U-Channels of the Mount Body. In the depicted embodiment, U-Channel 201-1-2 is positioned on top of 201-2-2 and U-Channel 201-1-1 is positioned beneath 201-2-1. Tightening Mechanisms 201-3A, 201-3B are inserted/assembled through the holes 201-1-8, 201-2-8.

Figure 27:
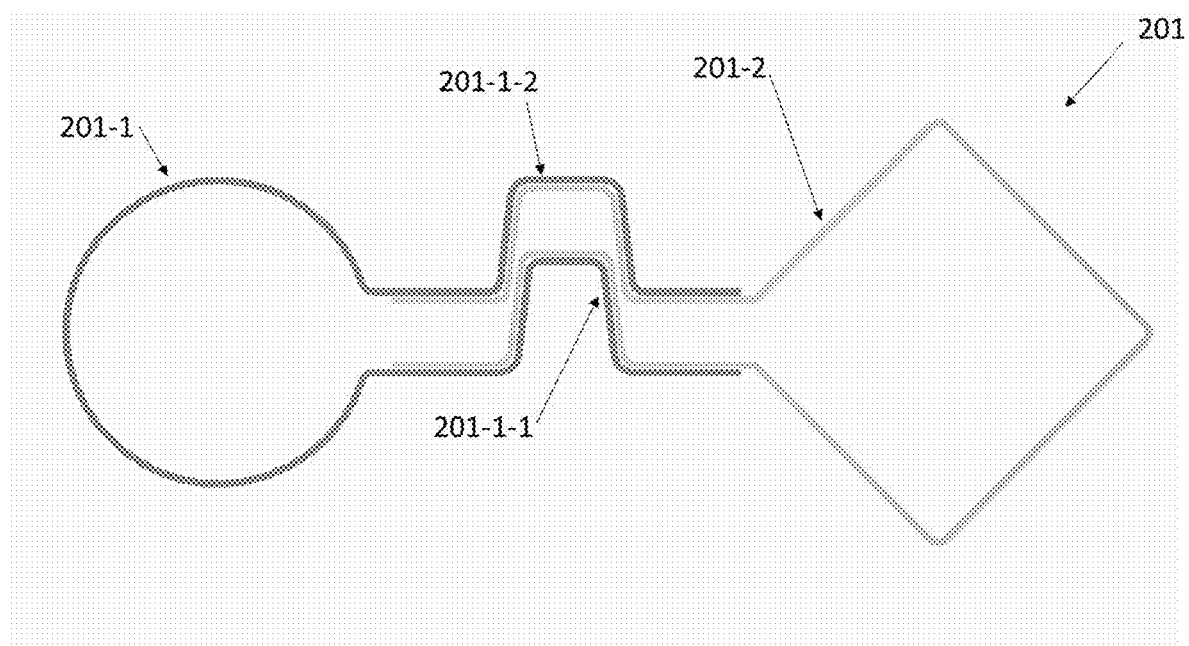
FIG. 27 is a top orthogonal view of another embodiment of a Clamp in accordance with the present inventive concepts.

FIG. 27 is a top orthogonal view of an embodiment of a Clamp 201 in accordance with the present inventive concepts. The Pole Clamp Body 201-1 is depicted in darker shading and whereas the Mounting Clamp Body 201-2 is shown in lighter shading. In the present embodiment, the Clamp Body and the Mount Clamp Body interlock by virtue of closely matching mating shapes. The U-Channels 201-1-1, 201-1-2 from each body interlock together on each side providing resistance to lateral movements. Upon application of the Tightening Mechanisms (See FIG. 28) the pole clamp body 201-1 and mounting clamp body 201-2 are effectively joined together. Upon further tightening the resulting U-Channels interlock preventing separation and relative motion of the two bodies 201-1, 201-2.

Figure 28:
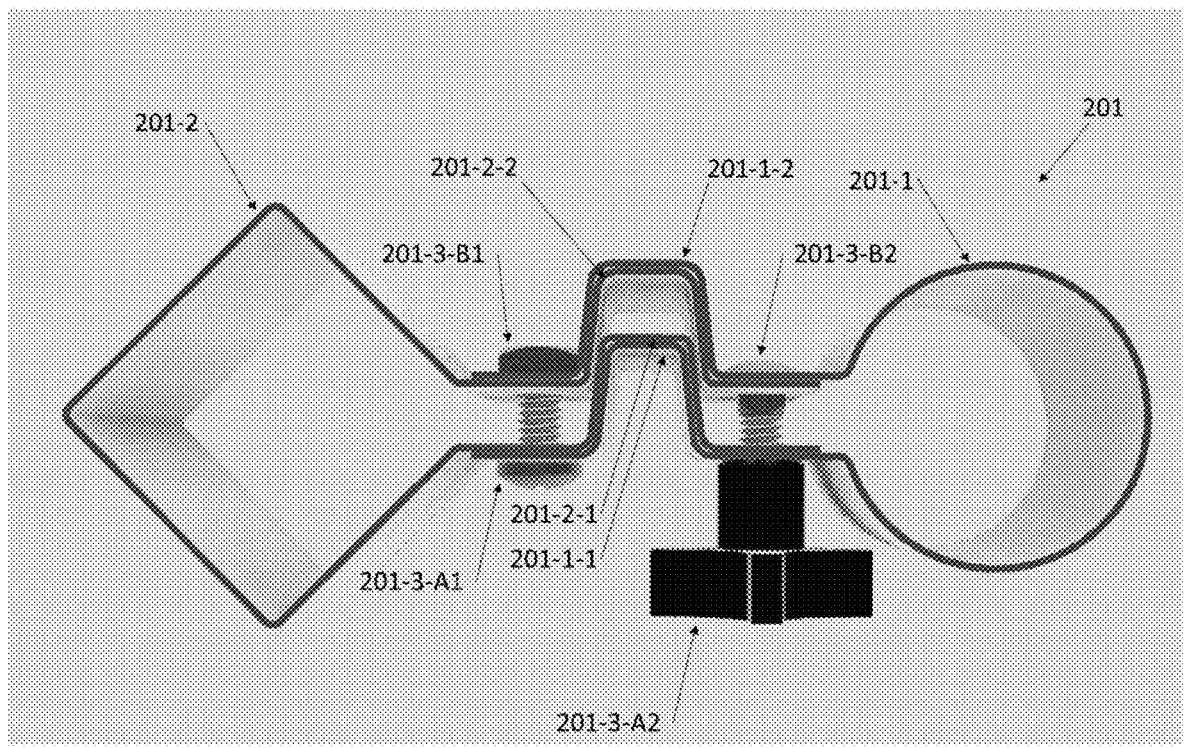
FIG. 28 is a perspective view of another embodiment of a Clamp in accordance with the present inventive concepts.

FIG. 28 is an assembled top perspective view of an embodiment of a Clamp 201 in accordance with the present inventive concepts. In the present embodiment, the two-piece Clamp embodiment using the square spindle Mount Body 201-2 and the Clamp Body 201-1 assembled. This shows the interlocking of the four U-Channels 201-1-2 and 201-2-2 as well as 201-1-1 and 201-2-1. As the two tightening mechanisms are tightened, the two overlapping U-Channel sections interlock as 201-2-1 presses into 201-2-2 adding lateral strength. In this embodiment, two separate and different types of Tightening Mechanisms are shown. For the Mount Body a screw 201-3A1 and square nut 201-3B1 are shown as the tightening mechanism. For the Clamp Body a carriage bolt 201-3-B2 and a hand knob 201-3-A2 are employed as shown. As described herein, the hank knob 201-3A2 can comprise an embedded threaded female insert or, alternatively, is of a unitary construction incorporating all necessary geometries.

Figure 29:
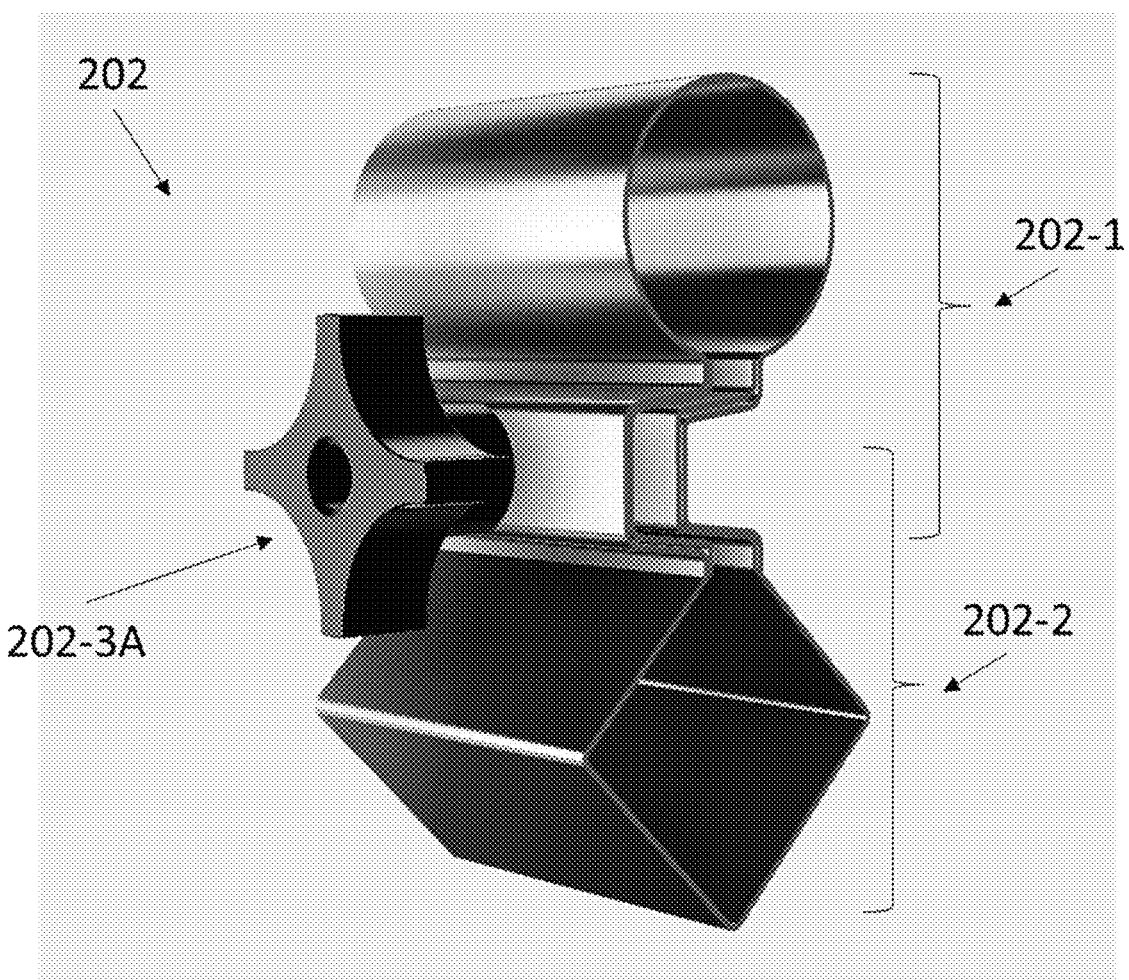
FIG. 29 is a perspective view of another embodiment of a Clamp in accordance with the present inventive concepts.

FIG. 29 is a perspective view of an embodiment of a Clamp 202 in accordance with the present inventive concepts. In the present embodiment, the two-piece Clamp 202 is a variation of the embodiment of the clamp 201 depicted herein in connection with FIGS. 25-28. In the present embodiment, lateral dimensions of the flats of the U-Beam and Z-Beam elements are reduced while widening lateral dimensions of the U-Channels in order to accommodate a tightening mechanism 202-3A being relocated to the center of the U-Channels. This provides for only needing one tightening mechanism per Clamp. The reduction of the flat of the beam elements keeps the effects of the tightening mechanism closer to the constriction point of the pole clamp band and the mounting clamp band. In the present embodiment, other features and elements of the clamp 202 are consistent with features and elements as described herein. Accordingly, further description of the consistent features and elements are not further described for the purpose of brevity.

Figure 30:
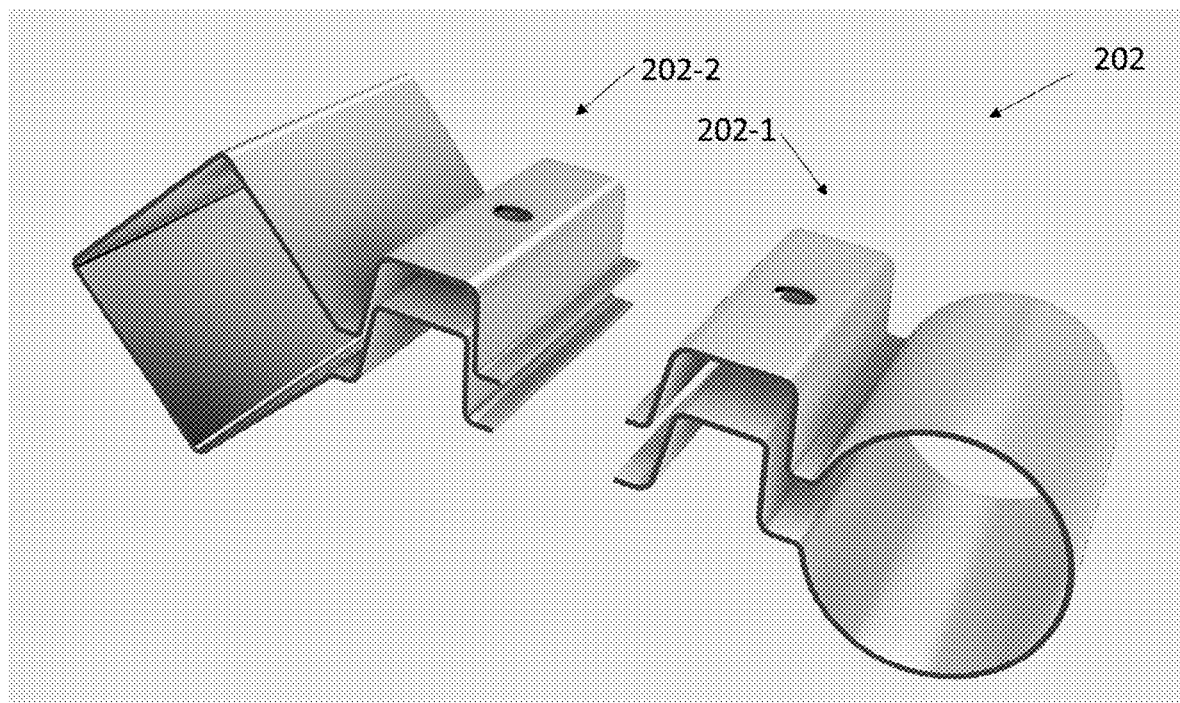
FIG. 30 is a perspective view of another embodiment of a Clamp in accordance with the present inventive concepts.

FIG. 30 is an exploded perspective view of an embodiment of a Clamp 202 in accordance with the present inventive concepts. In the present embodiment, the Clamp Body 202-1 and Mount Body 202-2 are separated for clarity showing the U-Channels as described herein in connection with alternative embodiments. The holes for the Tightening Mechanism are centered on the U Channels and the U-Channels themselves are wide enough to accommodate various Tightening Mechanism components such as carriage bolts, screws, square nuts, and the like, as described herein.

Figure 31:
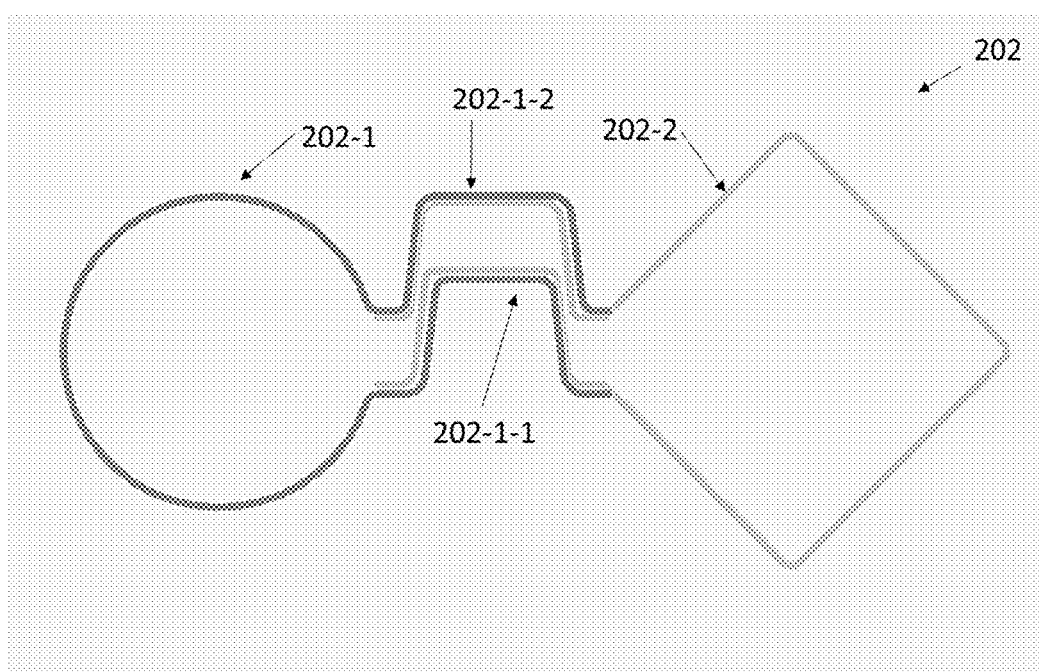
FIG. 31 is a top view of another embodiment of a Clamp in accordance with the present inventive concepts.

FIG. 31 is an orthogonal view of an embodiment of a Clamp 202 in accordance with the present inventive concepts. In the present embodiment, the Pole Clamp Body 202-1 is depicted in darker shading and whereas the Mount Body 202-2 is shown in lighter shading. In the present embodiment, the Pole Clamp Body and the Mount Clamp Body interlock by virtue of closely matching mating shapes as described herein. The U-Channels 202-1-1, 202-1-2 from each body interlock together on each side providing resistance to lateral movements and once tightened the U-Channels interlock with each other providing stability in all axes.

Figure 32:
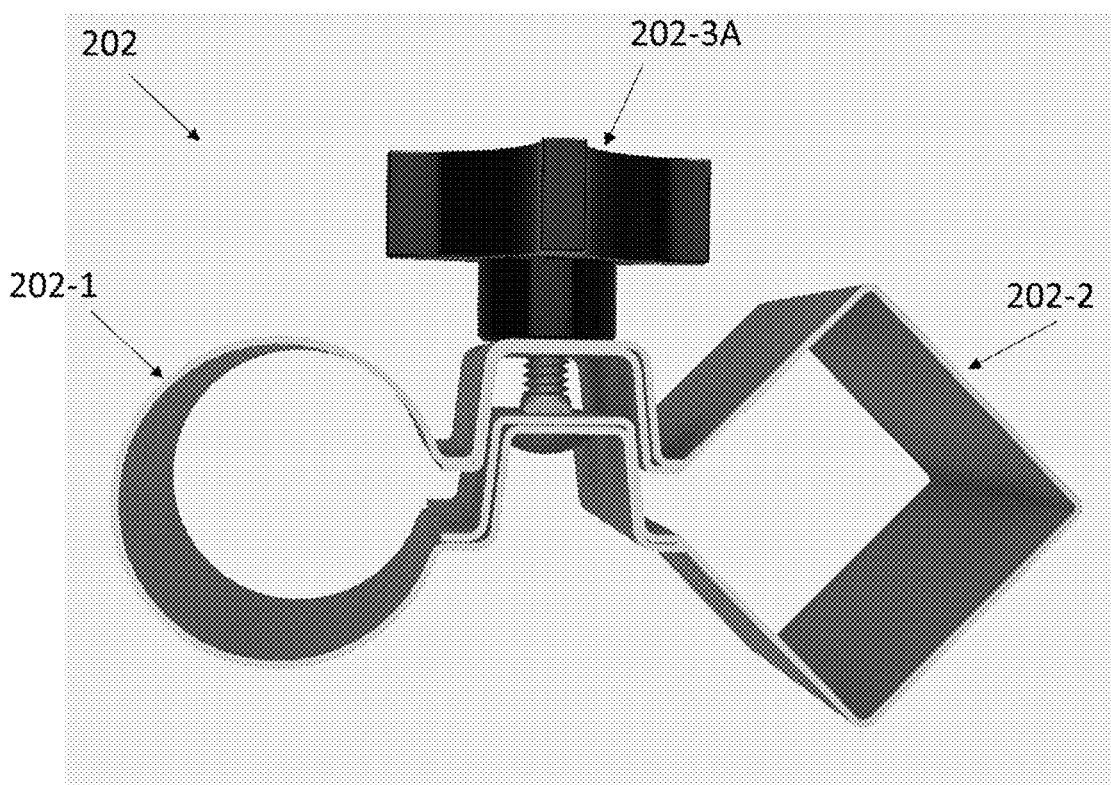
FIG. 32 is a perspective view of another embodiment of a Clamp in accordance with the present inventive concepts.

FIG. 32 is an assembled top perspective view of the embodiment of the Clamp 202 of FIGS. 29-31 in accordance with the present inventive concepts. In the present embodiment, a four-pronged hand knob and a carriage bolt is shown as the tightening mechanism 202-3A for constricting, or otherwise reducing the cross-sectional area of the clamp body as described herein.

Figure 42:
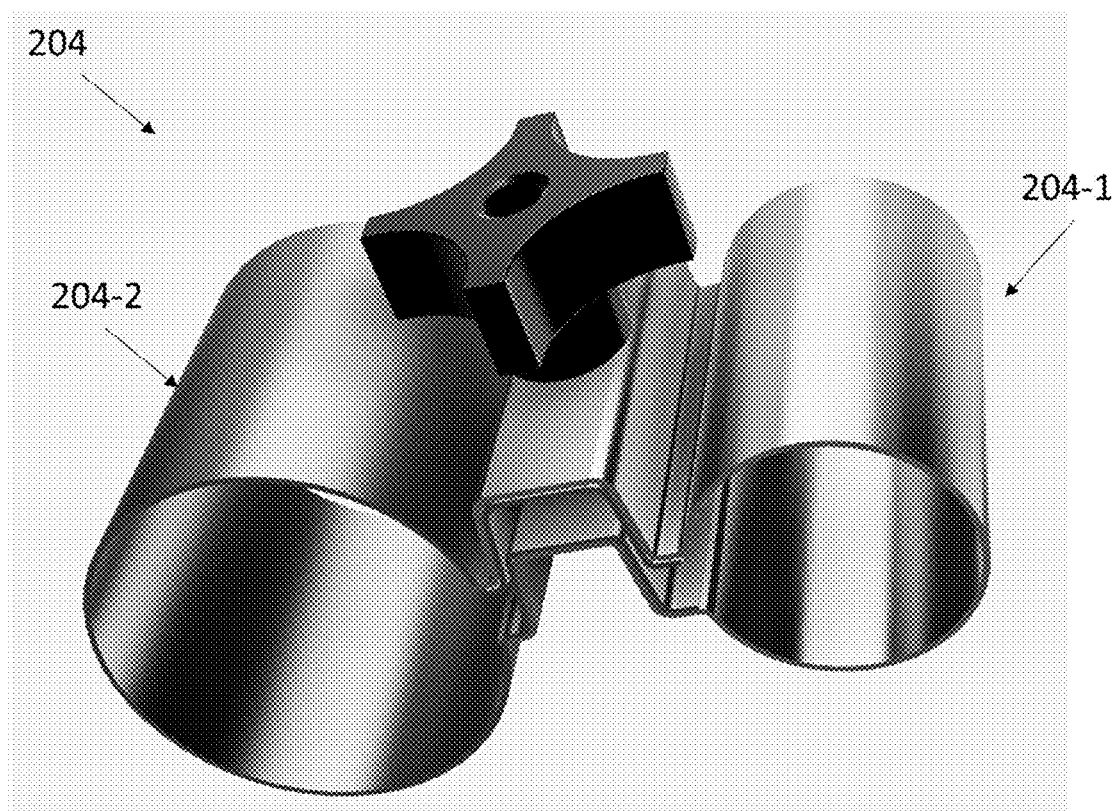
FIG. 42 is an assembled top perspective view of an embodiment of a Clamp in accordance with the present inventive concepts.

FIG. 42 is an assembled top perspective view of an embodiment of the Clamp 204 in accordance with the present inventive concepts. In the present embodiment, the two-piece Clamp 204 is a variation of the embodiment of the clamp 202 depicted herein. The variation comprises a mount body 204-2 which is constructed and arranged to mount to a different supporting element. In the case of the embodiment 204 the mount body 204-2 is a larger cylindrical shape to accommodate mounting to a typical metal fence post of a nominal diameter of around 2.5 inches. This demonstrates an aspect of the clamping system being constructed and arranged such that portions of the 2-piece clamp can be interchanged with alternate shapes to accommodate different structural elements for mounting without altering or otherwise affecting the clamp mount body 204-1. In the present embodiment, other features and elements of the clamp 204 are consistent with features and elements as described herein. Accordingly, further description of the consistent features and elements are not further described for the purpose of brevity.

Figure 39:
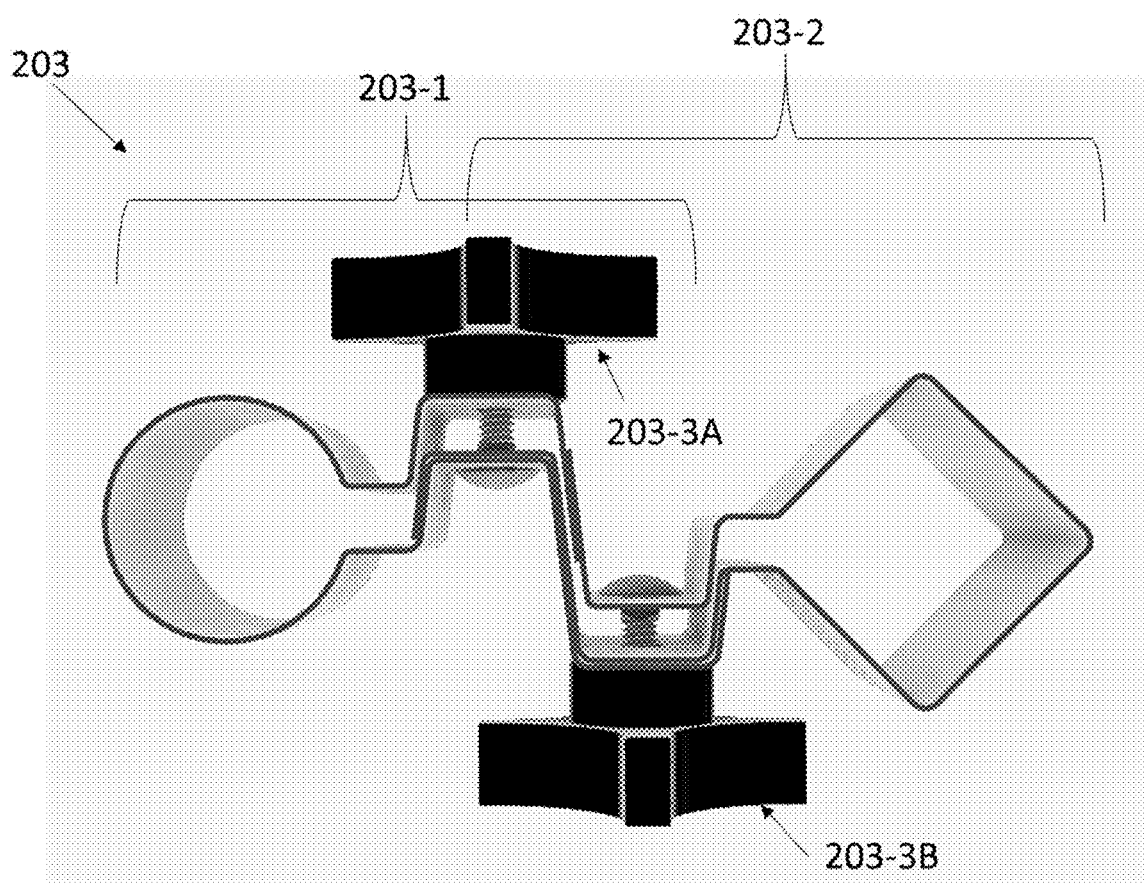
FIG. 39 is a top perspective view of an embodiment of a Clamp in accordance with the present inventive concepts.
Figure 40:
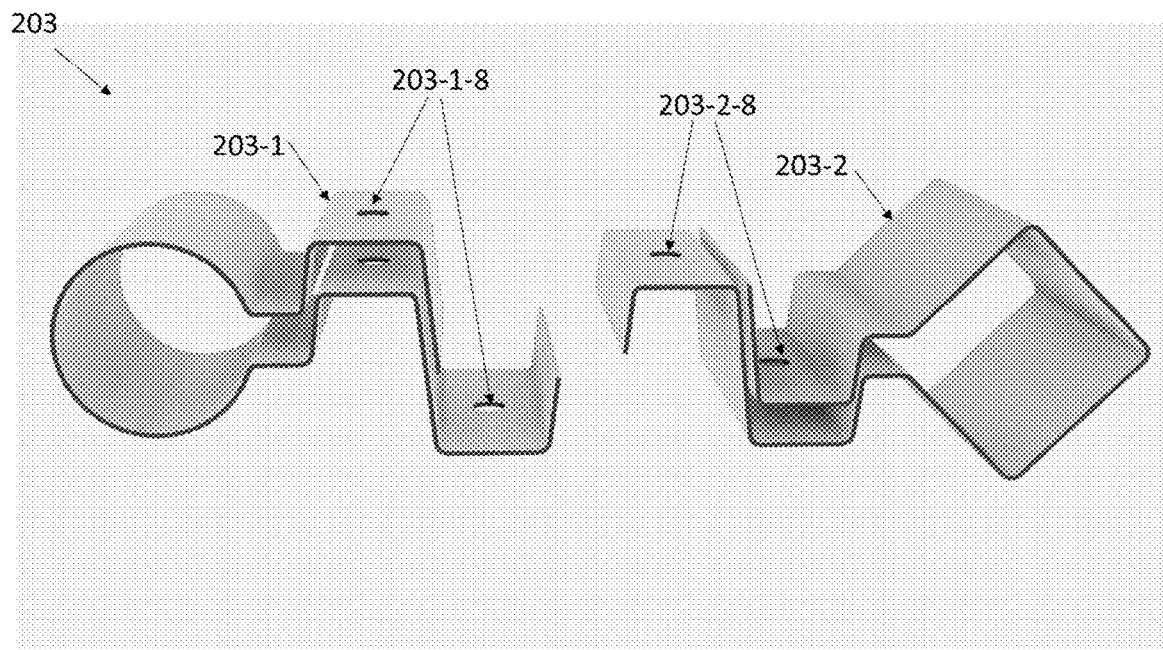
FIG. 40 is a top perspective view of components of an embodiment of a Clamp in accordance with the present inventive concepts.

FIG. 39 is a perspective view of an embodiment of a Clamp 203 in accordance with the present inventive concepts. Shown is an assembled embodiment 203 of a 2-piece clamp which utilizes a separate Clamp Body 203-1 and Mount Body 203-2 in a different geometry than other embodiments described herein. This embodiment utilizes the interlocking U-Channels as in other embodiments and has one set of interlocking U-channels for each of the Clamp Body 203-1 and Mount Body 203-2 sections. This configuration allows for each Clamp Band to be tightened independently without the tightening effects of the other interfering. This image is shown with two large hand knobs and carriage bolts as the Tightening Mechanism 203-3A, 203-3B as described herein FIG. 40 is an exploded perspective view of components of an embodiment of a Clamp 203 in accordance with the present inventive concepts. Shown is the Clamp Body 203-1 and Mount Body 203-2 of the 203 Clamp embodiment. The two bodies are shown separated for clarity and to show the geometries of the interlocking U-Channel regions. As described herein in alternate embodiments, the U-Channels interlock with each other and include holes 203-1-8, 203-2-8 to accommodate the components of Tightening Mechanisms as shown centered on each U-Channel member.

Figure 41:
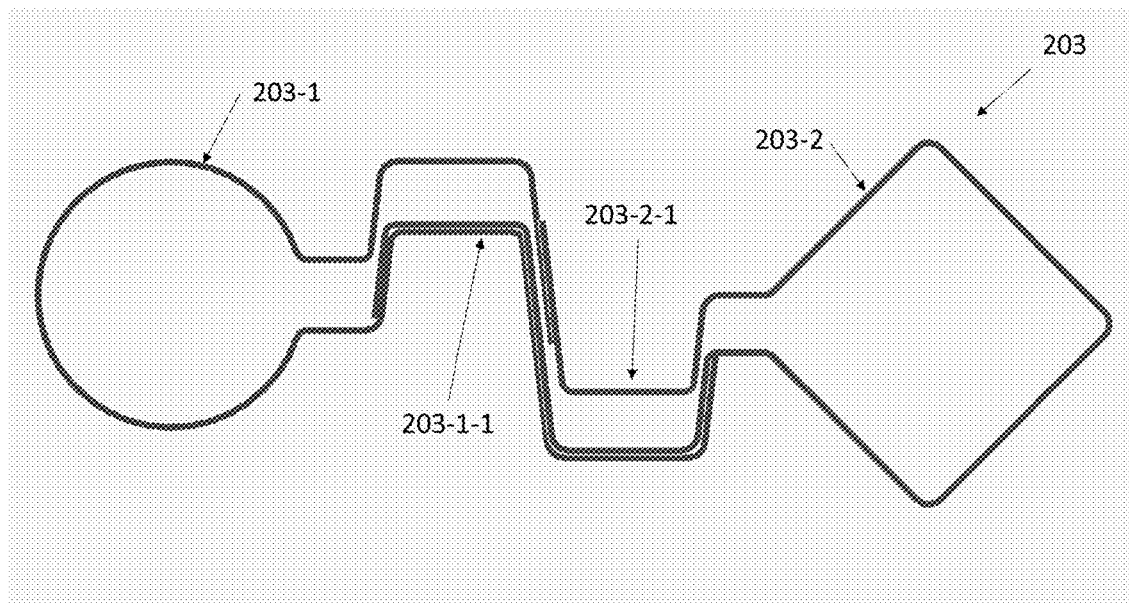
FIG. 41 is a top orthogonal view of an embodiment of a Clamp in accordance with the present inventive concepts.

FIG. 41 is a top cutaway view of an embodiment of a 203 Clamp in accordance with the present inventive concepts. Shown is a top view of the 203 Clamp embodiment with Clamp Body 203-1 and Mount Body 203-2 shown as assembled. As described herein, the U-Channels 203-1-1, 203-2-1 from each body 203-1, 203-2 are constructed and arranged such that the U-Channels nest together and interlock. Once the Tightening Mechanisms are inserted and tightened, the two bodies are fastened together. Further tightening constricts the Clamp Band and Mount Band tightly around their respective pole/post elements as well as interlocking the two U-Channel elements together for lateral stability.

Figure 33:
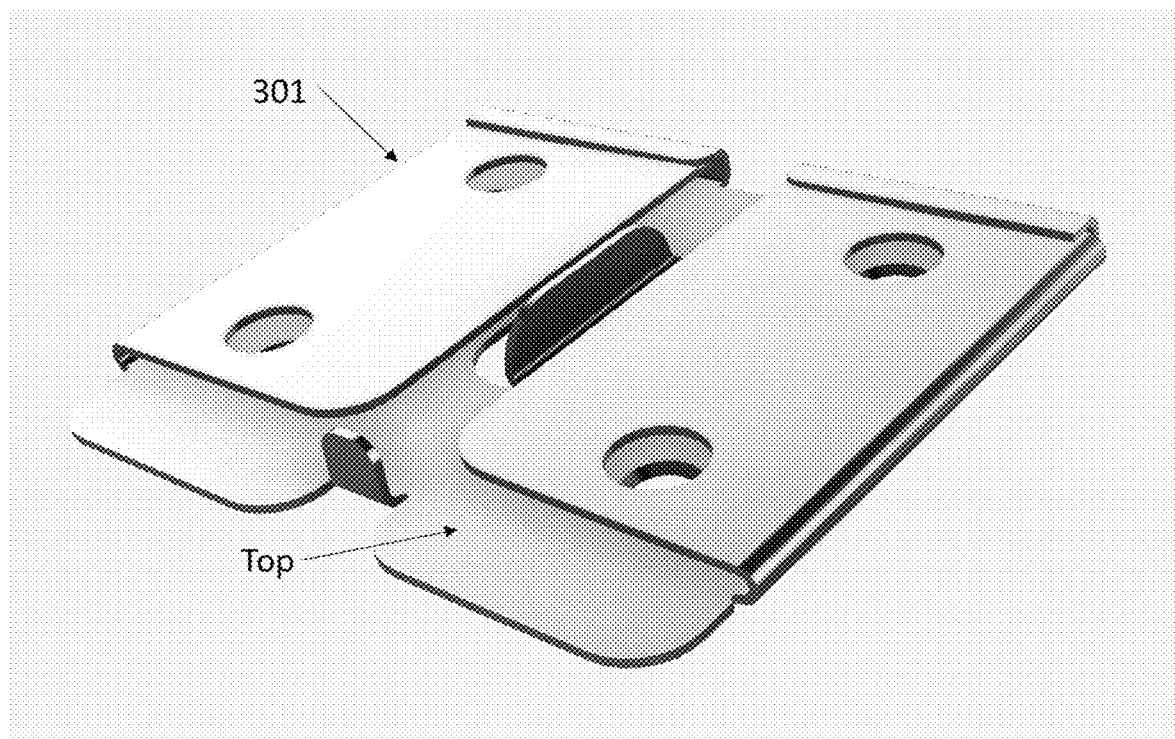
FIG. 33 is a perspective view of an embodiment of a Quick Release Adapter in accordance with the present inventive concepts.

FIG. 33 is a perspective view of an embodiment of a Quick Release Adapter 301 in accordance with the present inventive concepts. In the present embodiment, a Quick Release Adapter (abbreviated "QRA") 301 is to be arranged with the Clamp 101 embodiment, which is the flat mount style. This QRA is installed on a stable post such as a deck railing support post and serves as a receptacle with geometry which is constructed and arranged to allow the Clamp 101 to slide into the top of the QRA 301. The same tightening action of the Clamp also secures it to the QRA via protrusions which interact with the Clamp geometry.

Figure 34:
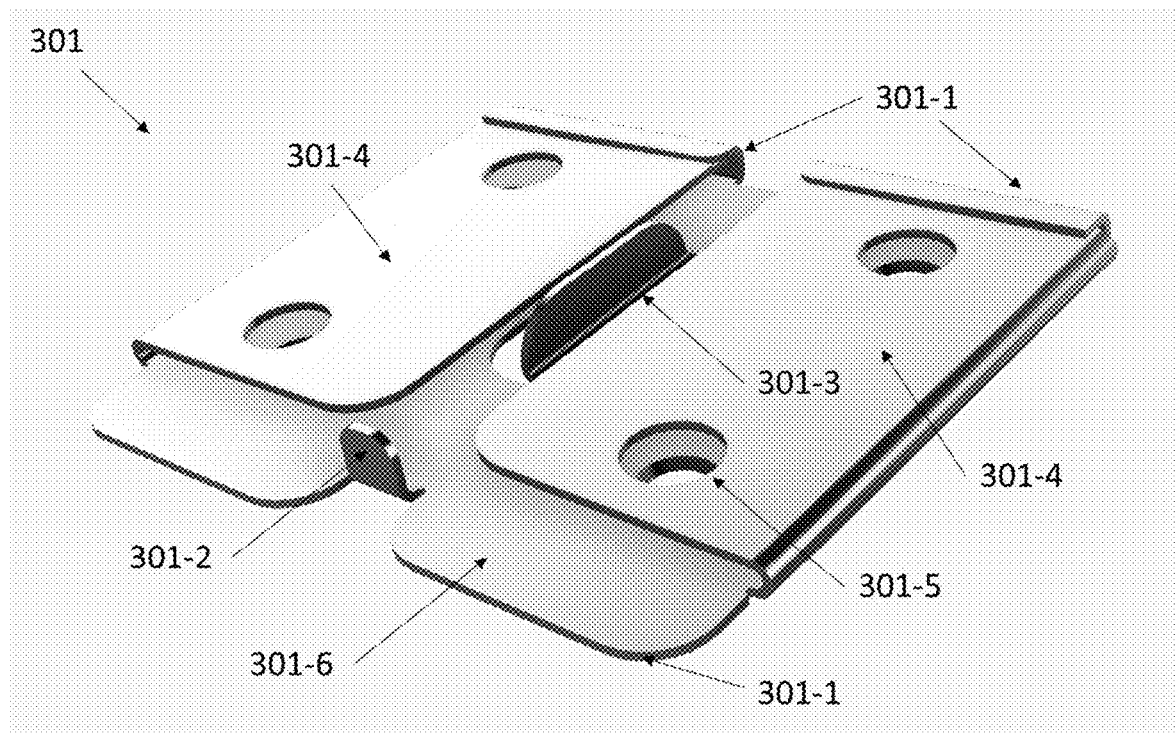
FIG. 34 is a perspective view of an embodiment of a Quick Release Adapter in accordance with the present inventive concepts

FIG. 34 is a perspective view of an embodiment of a Quick Release Adapter 301 in accordance with the present inventive concepts. A pair of bottom channels 301-1 holds the bottom edge of the Clamp once inserted into the QRA. A section in the center of the channel is cut away to accept the T shaped profile of the bottom of the mounting area of the Clamp 101. The top tab 301-2 prevents the Clamp from moving up once the Clamp has been tightened. Center tab 301-3 prevents lateral movement of the clamp once tightened. The pockets formed by Pocket Flanges 301-4 restrain the Clamp 101 in the third axis. The holes 301-5 are comprised of 4 identical sets of a larger clearance hole through the Pocket Flanges 301-4 as well as a smaller chamfered hole through the back plate 301-6 for mounting to a suitable post. The chamfered holes are to accept a standard countersink wood screw so that the screw body can be flush to the material. In this embodiment the hole pattern matches that of the Clamp to provide additional mounting options. One such option is to have one or more mounting screws be able to be inserted through the completed assembly of QRA and Clamp for additional security, while also providing ease of removal of the Clamp leaving a lower profile permanently installed QRA bracket attached to the suitable post or similar. The QRA functions as an effective receptacle for a Clamp 101 to be readily inserted and removed while providing effective stability while in use.

Figure 35:
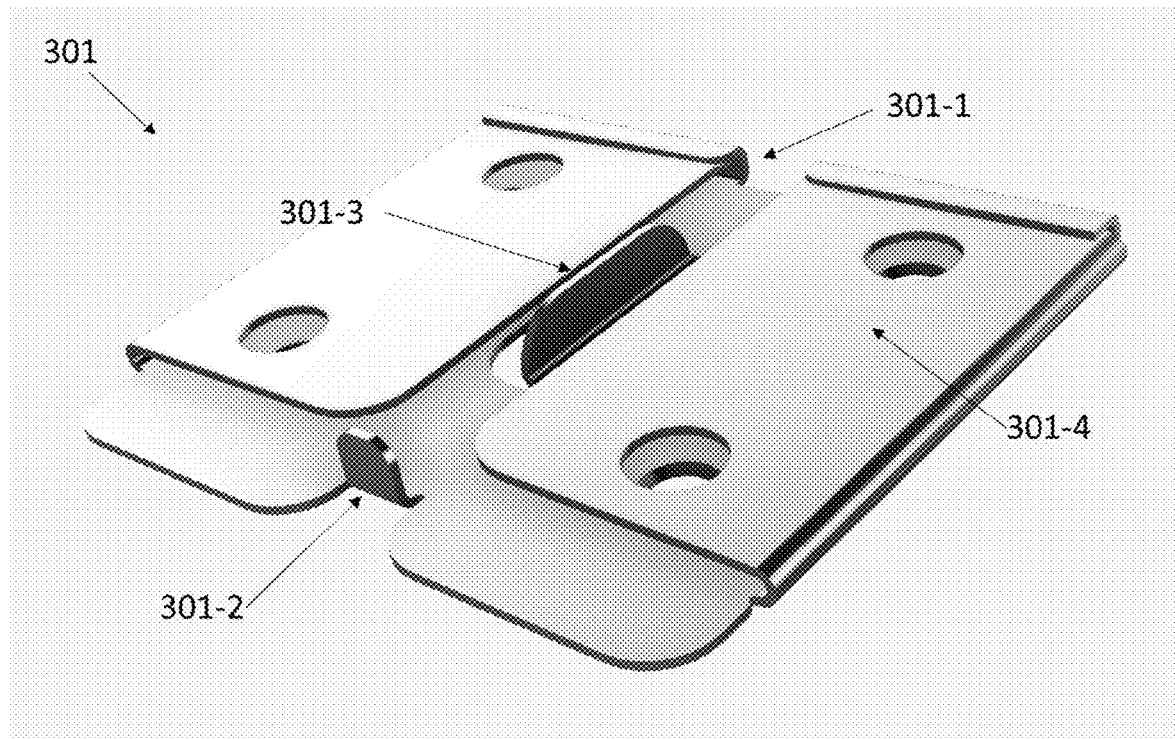
FIG. 35 is a perspective view of an embodiment of a Quick Release Adapter in accordance with the present inventive concepts.

FIG. 35 is a perspective view of an embodiment of a Quick Release Adapter 301 in accordance with the present inventive concepts. In the present embodiment, an isometric view of the QRA 301 showing the pocket flanges 301-4 and the resulting pockets formed by their geometry. The T shaped profile of the 101 Clamp embodiment slides into these pockets, and the two parallel stems of the T profile slide down either side of the top tab 301-2 and past the center tab 301-3. When the Clamp is fully inserted it will be just beyond the top tab 301-2. Tightening of the Clamp brings the two T stem legs together sandwiching the center tab, and moving underneath the top tab. The center tab prevents lateral motion and the top tab prevents lifting out of the QRA. The Clamp bottom rests on the bottom channel 301-1 and is secured from forward motion by the pocket flanges 301-4. The inserted and tightened Clamp 101 is captured in all three axes once assembled.

Figure 36:
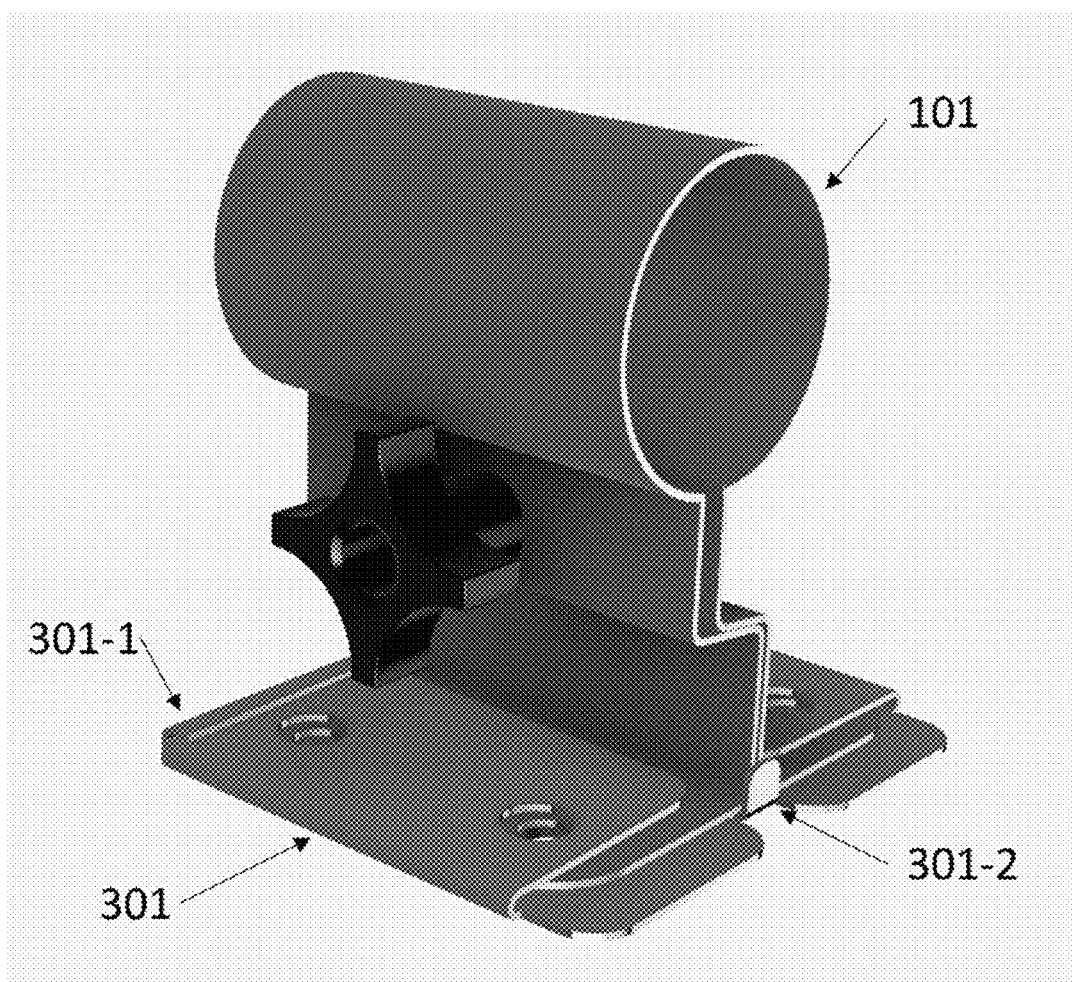
FIG. 36 is a front perspective view of an embodiment of a system including a Clamp and Quick Release Adapter 301 in accordance with the present inventive concepts.
Figure 37:
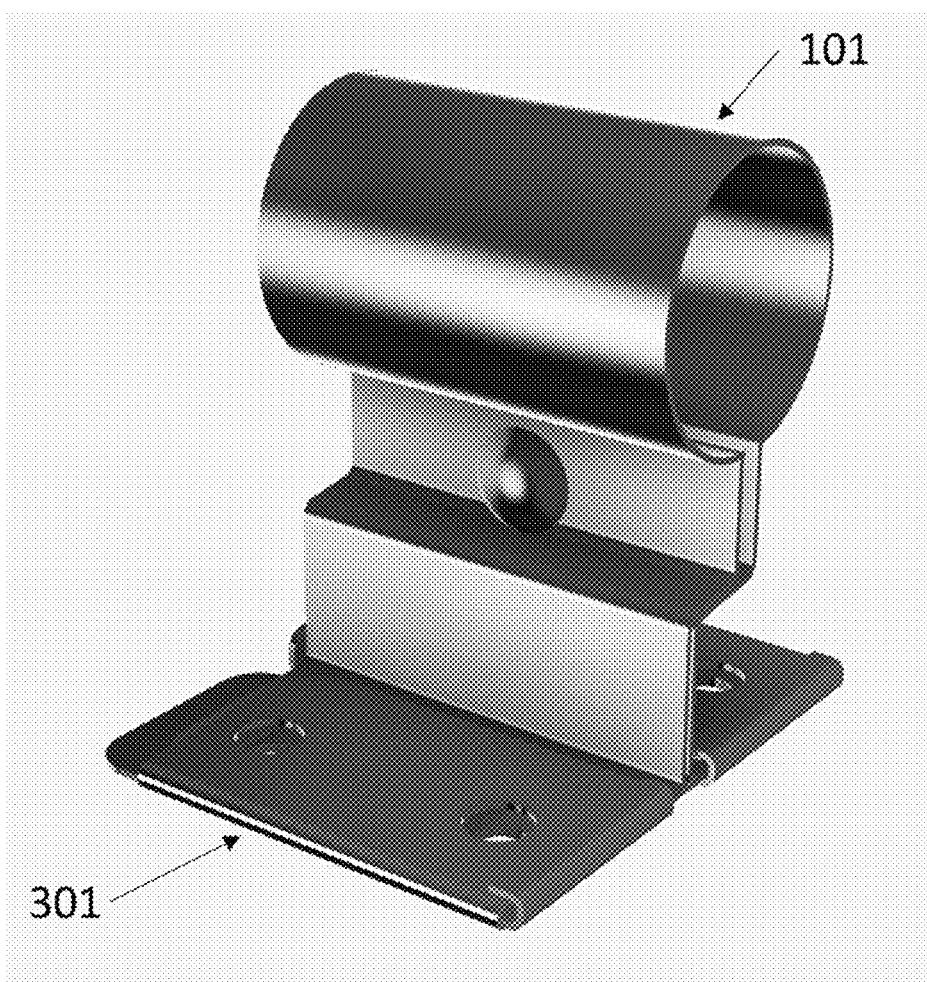
FIG. 37 is a rear perspective view of an embodiment of a system including a clamp and Quick Release Adapter in accordance with the present inventive concepts.

FIGS. 36 and 37 are a front perspective view and rear perspective view, respectively, of an embodiment of a Clamp 101 and Quick Release Adapter 301 in accordance with the present inventive concepts. In the present embodiment, the Clamp 101 is inserted into QRA 301. In the present embodiment, the Clamp is shown in the tightened position so that the legs of the Clamp 101 are pulled close together so that the Clamp is trapped between the bottom channel 301-1 and the top tab 301-2. The same tightening action also sandwiches the clamp legs around the center tab 301-3.

Figure 38:
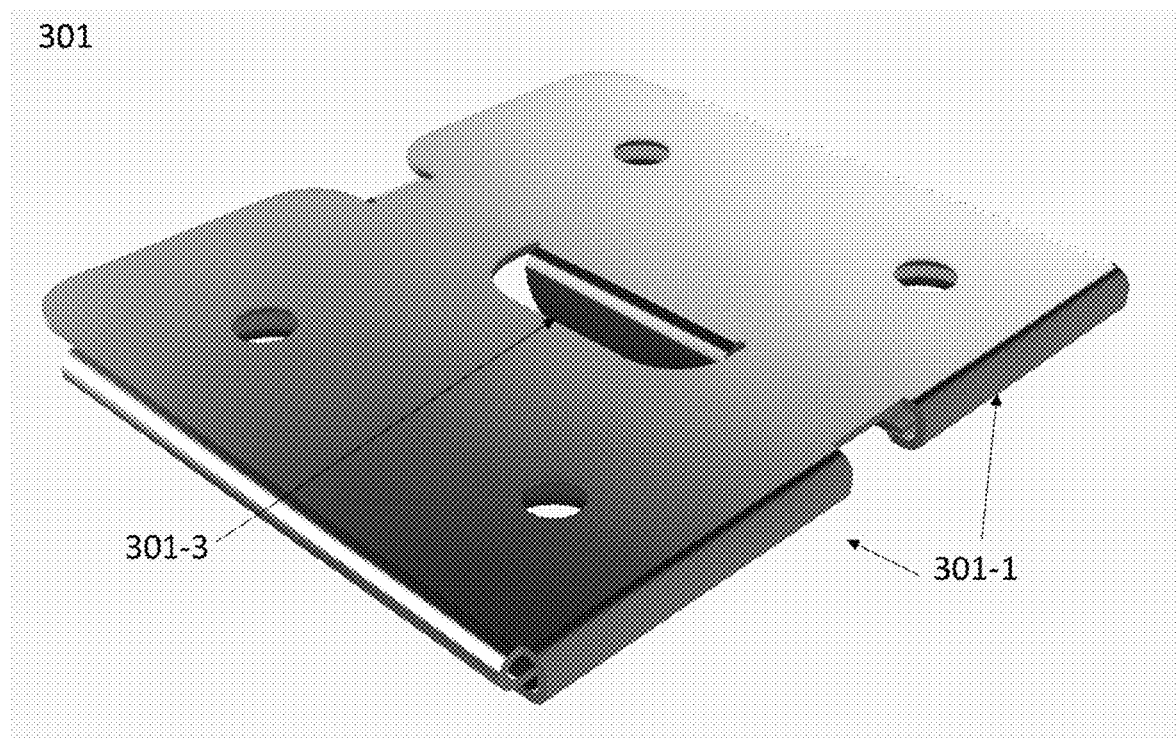
FIG. 38 is a rear perspective view of an embodiment of a Quick Release Adapter in accordance with the present inventive concepts.

FIG. 38 is a rear perspective view of an embodiment of a Quick Release Adapter 301 in accordance with the present inventive concepts. This view depicts the bottom channels 301-1 with the resulting gap between them. This gap allows for the T shape of the Clamp embodiment 101 in the center area. The center tab 301-3 is shown from the back plate side. In some embodiments, the hole resulting from the center tab 301-3 results from a piercing/bending operation of the material to define and fold the tab 301-3 away from the bottom plate into a perpendicular tab.

In some embodiments, the clamp band 101-10 is circular in cross section and elongated along an axis of extension or longitudinal axis Z (see, for example, FIG. 1). In some embodiments, an inner diameter D (see, for example, FIG. 1) of the clamp band 101-10 is in a range of about 1 inch to about 3 inches. In some embodiments, the inner diameter D is about 1.5 inches.

In some embodiments, the clamp band 101-10 is elongated along an axis of extension and has a height H (see, for example, FIG. 1) in a range of about 1 inches to about 5 inches. In some embodiments, the height H is about 2.5 inches In some embodiments, the square profile mounting band 201-2-10 of the mounting clamp 201-2 (see for example, FIG. 26) has an inner width W in a range of about 1 inches to about 6 inches. In some embodiments, the inner width W is about 1.5 inches In some embodiments, the gap g between leg 101-AC and 101-BD (see, for example, FIG. 4) is in a range of about 0.1 inches to about 0.5 inches. In some embodiments, the gap g is about 0.3 inches In some embodiments, the clamps described herein 101, 102, 201, 202, etc. comprise AISI 304 stainless steel. In some embodiments, the clamps described herein comprise AISI 316 stainless steel. In some embodiments, the clamps described herein comprise other common steel alloys. In some embodiments, the clamps described herein comprise non-metallic materials such as carbon fiber, plastics, and resins. In some embodiments, the clamps described herein have additional finish coatings like powder coating, anodization, and/or paint. In some embodiments, the clamps described herein are formed by bending operations. In some embodiments, the clamps described herein are formed by stamping operations. In some embodiments, the clamps described herein are formed by additive layering of material, i.e. 3D printing. In some embodiments, the clamps described herein are comprised of multiple pieces of material joined together via welding, crimping, bolting, riveting and/or using adhesives. In some embodiments, the clamps described herein are comprised of multiple sections of disparate materials. In some embodiments, the clamps described herein are comprised of unitary components.

In some embodiments, the clamps described herein for embodiments which incorporate interlocking U-Channels of various constructions and arrangements as described herein have the arrangement of the U-Channels forming a U shaped profile comprised of 3 sections generally referred to herein as a base or flat and 2 legs or sides, which in a true U shape would be parallel, are instead outwardly angled away from the center of the U-Channel forming an acute angle between them. This arrangement of a U-Channel geometry with the sides angled as described herein can naturally nest together as one slightly smaller U-Channel profile inserts into another slightly larger U-Channel. As the two or multiple coincident channels meet and touch each other, they form natural barriers to relative motion between the disparate components incorporating the U-Channel elements. If further tightening of the Clamp is necessary beyond the point of nested U-Channels making contact their respective sides, the nesting action can continue even further in beginning to deform the outermost U-Channel, causing its sides to spread slightly further apart and thereby increasing the angle described herein. In some embodiments, the process of spreading apart for further interlocking engagement comprises an elastic deformation which will return to the nominal dimension once the tightening mechanism is loosened. This construction and arrangement of U-Channel geometry allows for clamping to pole or structural elements which may be more undersized than design had intended for, while still producing an optimum nominal arrangement.

In various embodiments of the clamps described herein 101, 102, 201, 202, etc. the clamp band surface, for example 101-2, can be considered to "surround" the inserted object, for example an inserted pole. Similarly, in various embodiments, the mount band surface 201-2-10 (see, for example, FIG. 26) can be considered to "surround" the inserted spindle or fence pole (see for example, FIG. 42). The term "surround", as defined herein does not necessarily refer to a configuration that completely surrounds the inserted object, but rather surrounds at least 180 degrees of the surface of the inserted object. In this manner, in various embodiments, the clamp band surface 101-2 can extend more than 180 degrees about a center point of the clamp band surface, can extend more than 270 degrees about a center point of the clamp band surface, or can extend more than 270 degrees about a center point of the clamp band surface. An example of this is provided at FIG. 2 wherein it can be seen the clamp band surface 101-2 extends an angle α about the center point C of the clamp band surface 101-2. In various embodiments, the angle α can be greater than 180 degrees, greater than 270 degrees, or greater than 300 degrees. In some embodiments, this same concept applies to the mount band surface 201-2-10 of the mount band 201-2 (See FIG. 26). In the example embodiment of FIG. 26, it can be seen that the mount band 102-2-10 extends at least 180 degrees about its center point. In various embodiments, the term "surround" refers to a configuration that surrounds at least 180 degrees of an inserted object, but less than 360 degrees of the object. In particular, in each of the example embodiments, a gap g (see, for example, the embodiment of FIG. 2) is present in the clamp band surface 101-2 or mount band surface 201-2-10.

In some embodiments, the clamp embodiments described herein 101, 102, 201, 202, etc. may comprise a sheet metal material of the type described herein of a thickness ranging from about 0.01 inch to about 0.25 inch. In some embodiments, the clamp embodiments described herein comprise a sheet metal material of the type described herein of a thickness of 0.038 inches corresponding to a 20-gauge material. Material thickness may be selected based on desired relative strength and stiffness characteristics of the material.

In some embodiments, the clamps described herein 101, 102, 201, 202, etc. are constructed and arranged such that the clamp band and/or mount band having been formed by bending operations form a natural spring by virtue of the bending process. In some embodiments, assembly may require the restraint of the tightening mechanism in position to hold the form as described herein. For example, in a free, unrestrained state the clamp band or mount band may revert to a more open position. This is to say that the bending operation imparts both a plastic and an elastic deformation to the material. Plastic deformation is permanent while elastic deformation occurs during the application of a force. This the spring effect. In manufacturing bending operations this is known as "spring back".

The spring effect of the clamp band and/or mount band comprises the clamp body and/or mount body to naturally hold itself into the most open it can be given any restraints applied, such as the tightening mechanism when in place. This effect causes the bands to follow the dimension allowed by the tightening mechanism as it is loosened and to somewhat naturally resist the tightening force. This effect also aids in the assembly of the mount band in embodiments which have one to more readily spread its legs open to engage with the mounting surface element such as a deck spindle or fence post or to apply a clamp body around a mount body in two-piece embodiments.

In some embodiments, the clamps described herein 101, 102, 201, 202, etc. and for embodiments which have circular body profiles such as the fence post variation of the mount body, are constructed and arranged by forming the clamp band or mount band using bending or similar stamping operations. For a resulting circular profile on what is a spring element as described herein, initial formation of a constant radius along the entire circumference of the band(s) results in an oval shape rather than a circle once restrained by the tightening mechanism. This is due to the leverage created by the force applied at a distance which causes the highest stress, and thus the highest elastic deformation, to occur at the furthest point from the force which due to the geometry is a fulcrum. Thus, the portion of the circle opposite the opening gap deforms to a tighter radius than portions of the circle that are closer to the force applied. This results in more of an oval shape in the clamp band and/or circular mount band while in use. The oval shape still functions but requires more tightening to bring the shape back to circular as it conforms around the pole being restrained in order to apply a uniform force radially to the pole being restrained. This results in providing a somewhat larger gap according to design accommodations.

In some embodiments, the clamps described herein 101, 102, 201, 202, etc. and for embodiments which have circular profiles as described herein are formed in a bending operation with intentional attention given to avoiding the potential of a resulting oval as described herein. In some embodiments this is accomplished by avoiding bending the clamp band and/or mount band in the area proximal to the area which will result opposite the gap area to the same radius as the remainder of the respective band will be. In other words, a variable radius bending operation is employed with the least radius applied at what will be the highest stress area when constrained by the tightening mechanism. This results in a free body curve with a variable radius remaining after the plastic deformation is imparted on the material. Upon being restrained by the tightening mechanism, the resulting higher material stress at the fulcrum area results in more elastic deformation proximal to the fulcrum bringing the resulting as-restrained radius roughly equivalent to the radius pre-formed in the remaining less stressed areas of the band(s). The end result is a close-fitting circular profile when assembled for use, minimizing additional deformation to operate effectively as a clamp as described herein.

While inventive concepts have been particularly shown and described with references to embodiments thereof, it will be understood by those skilled in the art that various changes in form and detail may be made herein without departing from the spirit and scope of the inventive concepts as defined by the appended claims.

I claim:

1. A clamp comprising:
   a clamp band having a band surface;
   a first beam element at a first portion of the band surface;
   a second beam element at a second portion of the band surface;
   a mount, a first portion of the mount at the first beam element opposite the first portion of the band surface and a second portion of the mount at the second beam element opposite the second portion of the band surface; and
   a tightening mechanism coupled to the first beam element and the second beam element that imparts a compressive force on the first and second beam elements, the compressive force in turn imparting an inward force at the band surface of the clamp band, wherein the compressive force of the tightening mechanism causes the first beam element and second beam element to interlock.

2. The clamp of claim 1 wherein the first and second beam elements are positioned between the clamp band and the mount.

3. The clamp of claim 1 wherein the clamp band, first beam element, second beam element, and mount are unitary.

4. The clamp of claim 1:
  wherein the first beam element comprises a first opening;
  wherein the second beam element comprises a second opening; and
  wherein the tightening mechanism comprises a carriage bolt and nut, the carriage bolt passing through the first and second openings.

5. The clamp of claim 1 wherein the inward force imparts a frictional hold force on an inserted object.

6. The clamp of claim 1 wherein the clamp band surface is circular in cross-section other than an open region between the first portion and the second portion of the band surface.

7. The clamp of claim 1 wherein the clamp band surface is cylindrical other than an open region between the first portion and the second portion of the band surface.

8. The clamp of claim 1 wherein the clamp band surface extends more than 270 degrees about a center point of the clamp band surface.

9. The clamp of claim 1 wherein the compressive force of the tightening mechanism imparted on the first and second beam elements reduces a cross-sectional area of the clamp band.

10. The clamp of claim 1 wherein at least one of the first beam element and second beam element comprises a U-beam.

11. The clamp of claim 10 wherein the U-beam comprises a "U-shaped" cross-section comprising:
  a base;
  a first leg at a first end of the base; and
  a second leg at a second end of the base opposite the first leg, wherein the first and second legs are not parallel and lie at an acute angle relative to other.

12. The clamp of claim 11 wherein the tightening mechanism passes through an opening in the base of the U-beam.

13. The clamp of claim 1 wherein at least one of the first beam element and second beam element comprises a Z-beam.

14. The clamp of claim 13 wherein the Z-beam comprises a "Z-shaped" cross-section comprising:
  a base;
  a first leg at a first end of the base; and
  a second leg at a second end of the base opposite the first leg, wherein the first and second legs are not parallel and lie at an acute angle relative to other.

15. The clamp of claim 14 wherein the tightening mechanism passes through an opening in at least one of the first and second legs of the Z-beam.

16. The clamp of claim 1 wherein the first beam element and second beam element each have first and second sidewalls that lie at acute angles relative to each other so that when they interlock under the compressive force of the tightening mechanism, an outward force is exerted through the first and second sidewalls of the beam elements.

17. The clamp of claim 1 wherein the first portion of the mount comprises a first mount extension leg and wherein the second portion of the mount comprises a second mount extension leg.

18. The clamp of claim 17 wherein the first portion of the mount further comprises a first mount foot and wherein the second portion of the mount further comprises a second mount foot.

19. The clamp of claim 18 wherein the first mount foot and second mount foot lie on first and second planes that are co-planar.

20. The clamp of claim 18 wherein the first mount foot and second mount foot lie on first and second planes that are perpendicular to each other.

21. The clamp of claim 18 wherein the first mount foot and second mount foot lie on first and second planes that are parallel to each other.

22. The clamp of claim 1 wherein the mount comprises a mount clamp, the mount clamp comprising:
  a mount band having a mount band surface;
  a first mount beam element at a first portion of the mount band surface;
  a second mount beam element at a second portion of the mount band surface;
  the first mount beam element interfacing with the first beam element and the second mount beam element interfacing with the second beam element; and
  a mount tightening mechanism coupled to the first mount beam element and the second mount beam element that imparts a compressive force on the first and second mount beam elements, the compressive force in turn imparting an inward force at the band surface of the mount band.

23. The clamp of claim 22 wherein the mount tightening mechanism is independent of the clamp tightening mechanism.

24. The clamp of claim 22 wherein the mount tightening mechanism and clamp tightening mechanism are a same mechanism.

25. A clamp comprising:
  a clamp band having a band surface;
  a first beam element at a first portion of the band surface;
  a second beam element at a second portion of the band surface, wherein at least one of the first beam element and second beam element comprises a U-beam;
  a mount, a first portion of the mount at the first beam element opposite the first portion of the band surface and a second portion of the mount at the second beam element opposite the second portion of the band surface; and
  a tightening mechanism coupled to the first beam element and the second beam element that imparts a compressive force on the first and second beam elements, the compressive force in turn imparting an inward force at the band surface of the clamp band.

26. The clamp of claim 25 wherein the U-beam comprises a "U-shaped" cross-section comprising:
  a base;
  a first leg at a first end of the base; and
  a second leg at a second end of the base opposite the first leg, wherein the first and second legs are not parallel and lie at an acute angle relative to other.

27. The clamp of claim 26 wherein the tightening mechanism passes through an opening in the base of the U-beam.

28. A clamp comprising:
  a clamp band having a band surface;
  a first beam element at a first portion of the band surface;
  a second beam element at a second portion of the band surface, wherein at least one of the first beam element and second beam element comprises a Z-beam;
  a mount, a first portion of the mount at the first beam element opposite the first portion of the band surface and a second portion of the mount at the second beam element opposite the second portion of the band surface; and
  a tightening mechanism coupled to the first beam element and the second beam element that imparts a compressive force on the first and second beam elements, the compressive force in turn imparting an inward force at the band surface of the clamp band.

29. The clamp of claim 28 wherein the Z-beam comprises a "Z-shaped" cross-section comprising:
a base;
a first leg at a first end of the base; and
a second leg at a second end of the base opposite the first leg, wherein the first and second legs are not parallel and lie at an acute angle relative to other.

30. The clamp of claim 29 wherein the tightening mechanism passes through an opening in the base of the Z-beam.

31. A clamp comprising:
a clamp band having a band surface;
a first beam element at a first portion of the band surface;
a second beam element at a second portion of the band surface;
a mount, a first portion of the mount at the first beam element opposite the first portion of the band surface and a second portion of the mount at the second beam element opposite the second portion of the band surface, wherein the first portion of the mount comprises a first mount extension leg and wherein the second portion of the mount comprises a second mount extension leg; and
a tightening mechanism coupled to the first beam element and the second beam element that imparts a compressive force on the first and second beam elements, the compressive force in turn imparting an inward force at the band surface of the clamp band.

32. The clamp of claim 31 wherein the first portion of the mount further comprises a first mount foot and wherein the second portion of the mount further comprises a second mount foot.

33. The clamp of claim 32 wherein the first mount foot and second mount foot lie on first and second planes that are co-planar.

34. The clamp of claim 32 wherein the first mount foot and second mount foot lie on first and second planes that are perpendicular to each other.

35. A clamp comprising:
a clamp band having a band surface;
a first beam element at a first portion of the band surface;
a second beam element at a second portion of the band surface;
a mount, a first portion of the mount at the first beam element opposite the first portion of the band surface and a second portion of the mount at the second beam element opposite the second portion of the band surface; and
a tightening mechanism coupled to the first beam element and the second beam element that imparts a compressive force on the first and second beam elements, the compressive force in turn imparting an inward force at the band surface of the clamp band,
wherein the mount comprises a mount clamp, the mount clamp comprising:
a mount band having a mount band surface;
a first mount beam element at a first portion of the mount band surface;
a second mount beam element at a second portion of the mount band surface;
the first mount beam element interfacing with the first beam element and the second mount beam element interfacing with the second beam element; and
a mount tightening mechanism coupled to the first mount beam element and the second mount beam element that imparts a compressive force on the first and second mount beam elements, the compressive force in turn imparting an inward force at the band surface of the mount band.

36. The clamp of claim 35 wherein the mount tightening mechanism is independent of the clamp tightening mechanism.

37. The clamp of claim 35 wherein the mount tightening mechanism and clamp tightening mechanism are a same mechanism.

* * * * *